US012703813B2

(12) United States Patent
Niu et al.

(10) Patent No.: US 12,703,813 B2
(45) Date of Patent: Aug. 11, 2026

(54) COMPOSITION FOR PREPARING A RELEASE COATING, RELEASE COATING COMPOSITION, AND RELATED METHODS

(71) Applicant: DOW SILICONES CORPORATION, Midland, MI (US)

(72) Inventors: Zhenbin Niu, Midland, MI (US); Peng-Fei Fu, Midland, MI (US); Timothy Mitchell, Midland, MI (US); Yanhu Wei, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 858 days.

(21) Appl. No.: 17/789,186

(22) PCT Filed: Dec. 22, 2020

(86) PCT No.: PCT/US2020/066614

§ 371 (c)(1),
(2) Date: Jun. 25, 2022

(87) PCT Pub. No.: WO2021/138150

PCT Pub. Date: Jul. 8, 2021

(65) Prior Publication Data

US 2023/0050919 A1 Feb. 16, 2023

Related U.S. Application Data

(60) Provisional application No. 62/955,107, filed on Dec. 30, 2019.

(51) Int. Cl.

*C09J 7/40* (2018.01)
*C08G 77/20* (2006.01)
*C08J 7/04* (2020.01)
*C08L 83/04* (2006.01)
*C09D 183/04* (2006.01)

(52) U.S. Cl.

CPC .............. *C09J 7/401* (2018.01); *C08G 77/20* (2013.01); *C08J 7/0427* (2020.01); *C08L 83/04* (2013.01); *C09D 183/04* (2013.01); *C08J 2383/07* (2013.01)

(58) Field of Classification Search

CPC ...... C09J 7/401; C08J 7/0527; C08J 2383/07; C08G 77/20; C08L 83/04; C09D 183/04

See application file for complete search history.

(56) References Cited

U.S. PATENT DOCUMENTS 4,293,671 A 10/1981 Sasaki et al.
4,322,518 A 3/1982 Blizzard
5,292,586 A 3/1994 Lin et al.
5,468,816 A 11/1995 Hurford et al.
5,468,828 A 11/1995 Hurford et al.
5,837,784 A 11/1998 Vincent
6,124,419 A 9/2000 Armstrong et al.
6,387,487 B1 5/2002 Greenberg et al.
7,687,591 B2 3/2010 Bhagwagar et al.
7,728,080 B2 6/2010 Aoki
9,487,677 B2 11/2016 Griswold et al.
10,155,883 B2 * 12/2018 Huang ................. C09D 183/04
11,104,828 B1 8/2021 Cao et al.
2010/0255205 A1 * 10/2010 Cray ....................... C08L 83/06
524/506
2014/0287606 A1 9/2014 Hida et al.
2015/0285680 A1 10/2015 Kosterev
2016/0053148 A1 2/2016 Tsuchida
2016/0289388 A1 10/2016 Fu
2017/0022395 A1 1/2017 Griswold et al.
2023/0047845 A1 2/2023 Fu et al.
2023/0051588 A1 2/2023 Mitchell et al.
2023/0110842 A1 4/2023 Fu

FOREIGN PATENT DOCUMENTS

EP 0158459 A1 10/1985
EP 0400614 A2 12/1990
EP 0816463 A2 1/1998
WO 2005063890 A2 7/2005
WO 2008081913 A1 7/2008
WO 2011059462 A1 5/2011
WO 2018112911 A1 6/2018

(Continued)

OTHER PUBLICATIONS

International Search Report and Written Opinion for PCT/US2020/066614 dated Mar. 29, 2021, 10 pages.
International Search Report and Written Opinion for PCT/US2020/066619 dated Apr. 12, 2021, 10 pages.
International Search Report and Written Opinion for PCT/US2020/066622 dated Apr. 13, 2021, 10 pages.
Machine assisted English translation of JPH08013888 obtained from https://patents.google.com/patent on Nov. 1, 2022, 9 pages.
Machine assisted English translation of JP2036234 obtained from https://www.j-platpat.inpit.go.jp on Oct. 19, 2022, 15 pages.
Machine assisted English translation of JPH0726085 obtained from https://patents.google.com/patent on Oct. 19, 2022, 7 pages.

(Continued)

*Primary Examiner* — John M Cooney
*Assistant Examiner* — Adam J Berro
(74) *Attorney, Agent, or Firm* — Warner Norcross + Judd LLP

(57) ABSTRACT

A base composition for forming a release coating composition is disclosed. The base composition comprises (A) a silicate resin that is a liquid at 25° C. in the absence of any solvent. The (A) silicate resin includes an average of at least one silicon-bonded ethylenically un saturated group per molecule. The composition further comprises (B) an organopolysiloxane including an average of at least two silicon-bonded ethylenically un saturated groups per molecule. The (A) silicate resin is miscible with the (B) organopolysiloxane in the absence of any solvent. A method of preparing the base composition and a method of preparing a release coating composition are also disclosed.

15 Claims, No Drawings

(56) References Cited

FOREIGN PATENT DOCUMENTS

| | | | |
|---|---|---|---|
| WO | 2019079365 | A1 | 4/2019 |
| WO | 2019140197 | A1 | 7/2019 |
| WO | 202000387 | A1 | 1/2020 |
| WO | 2020000389 | A1 | 1/2020 |

OTHER PUBLICATIONS

Machine assisted English translation of JPH032270 obtained from https://worldwide.espacenet.com on Oct. 19, 2022, 6 pages.
Machine assisted English translation of JP02086678 obtained from https://www.j-platpat.inpit.go.jp on Oct. 19, 2022, 12 pages.
Machine assisted English translation of JP2750896 obtained from https://patents.google.com/patent on Oct. 18, 2022, 7 pages.
Machine assisted English translation of WO2012094885 obtained from https://patents.google.com/patent on Oct. 20, 2022, 11 pages.
Machine assisted English translation of JP2003055552 obtained from https://patents.google.com/patent on Oct. 19, 2022, 11 pages.
Machine assisted English translation of JP4054953 obtained from https://patents.google.com/patent on Oct. 18, 2022, 10 pages.
Paul Wu's Blog, "Release mechanism", Oct. 13, 2019, https://materean.com/release-mechanism/, 3 pages.

* cited by examiner

COMPOSITION FOR PREPARING A RELEASE COATING, RELEASE COATING COMPOSITION, AND RELATED METHODS

CROSS-REFERENCE TO RELATED APPLICATIONS

This application is the U.S. National Stage of International Application No. PCT/US2020/066614 filed on 22 Dec. 2020, which claims priority to and all advantages of U.S. Provisional Patent Application No. 62/955,107 filed on 30 Dec. 2019, the content of which is incorporated herein by reference.

TECHNICAL FIELD

The subject disclosure generally relates to a composition and, more specifically, to a composition for preparing a release coating and related methods.

BACKGROUND

Silicone compositions are known in the art and utilized in myriad industries and end use applications. One such end use application is to form release coatings or liners from which adhesives can be removed. For example, silicone release compositions may be utilized to coat various substrates, such as paper, to give release liners for laminating pressure sensitive adhesives (e.g. tapes). Such silicone release compositions are typically addition-curable.

Conventional release liners are typically formed by addition reacting (or hydrosilylating) an organopolysiloxane having an unsaturated hydrocarbon group and an organohydrogenpolysiloxane in the presence of a hydrosilylation reaction catalyst. In addition, various additives, like release modifiers and anti-mist additives, are incorporated in silicone release compositions for improving performance of the resulting release liners or methods of their preparation.

BRIEF SUMMARY

A base composition for forming a release coating composition is disclosed. The base composition comprises (A) a silicate resin that is a liquid at 25° C. in the absence of any solvent. The (A) silicate resin includes an average of at least one silicon-bonded ethylenically unsaturated group per molecule. The base composition further comprises (B) an organopolysiloxane including an average of at least two silicon-bonded ethylenically unsaturated groups per molecule. The (A) silicate resin is miscible with the (B) organopolysiloxane in the absence of any solvent.

A method of preparing the base composition and a method of preparing a release coating composition are also disclosed. In addition, a method of preparing a coated substrate comprising a release coating disposed on a substrate, as well as the coated substrate formed in accordance with the method, are disclosed.

DETAILED DESCRIPTION

A base composition for forming a release coating composition is disclosed. The base composition may be referred to herein merely as the composition.

The base composition comprises (A) a silicate resin that is a liquid at 25° C. in the absence of any solvent. The (A) silicate resin may alternatively be referred to as a silicone resin, but is a silicate resin in view of the presence of Q siloxy, or $SiO_{4/2}$, units in the (A) silicate resin. Generally, silicone resins and in particular silicate resins are solids at 25° C. due to their three-dimensional networked structure. In view of the difficulty of processing solid silicone resins, silicone resins are typically dissolved in solvent and utilized as a silicone resin composition, which comprises or consists of a solid silicone resin dissolved in a solvent, e.g. an aliphatic or aromatic hydrocarbon solvent. In this way, the silicone resin compositions are liquid at 25° C. or room temperature, which allows easier processing of the silicone resin compositions. For example, silicone resin compositions can be combined with other components or compositions for various end use applications in liquid form. Similarly, conventional silicone resins, which are solid at 25° C. in the absence of any solvent, are not readily miscible with liquid silicones. This means that when preparing silicone compositions, conventional silicone resins, which are solid at 25° C., cannot be readily mixed or solubilized with liquid silicones, e.g. liquid organopolysiloxanes, in the absent of organic solvent. Thus, when conventional silicone resins are utilized in silicone compositions, organic solvents are typically required for purposes of forming the silicone compositions and subsequently volatilized, either in composition form or when curing.

However, one drawback of silicone compositions is that the solvent is typically removed in end use applications. For example, when silicone compositions are utilized to form films or articles, the solvent is typically removed when forming such films or articles. This requires additional processing steps, as well as energy and related cost, for removal of solvent, e.g. via volatilization.

In contrast, the (A) silicate resin is a liquid at 25° C. in the absence of any solvent. Thus, the (A) silicate resin being a liquid at 25° C. is not attributable to the presence of any solvent, e.g. organic solvent, unlike conventional silicone resins. The (A) silicate resin consists of silicate resin without any solvent or carrier vehicle. Further still, not only is the (A) silicate resin a liquid at 25° C. in the absence of any solvent, but the (A) silicate resin is miscible with (B) an organopolysiloxane including an average of at least two silicon-bonded ethylenically unsaturated groups per molecule in the base composition. This allows for the base composition be readily formed without requiring any solvent, or related processing steps for removal of solvent from the base composition.

By "liquid", it is meant that the (A) silicate resin is flowable at 25° C. and/or has a viscosity that is measurable at 25° C., in the absence of any solvent. Typically, the viscosity of the (A) silicate resin is measurable at 25° C. via a Brookfield LV DV-E viscometer with a spindle selected as appropriate to the viscosity of the (A) silicate resin. The viscosity of the (A) silicate resin may vary, particularly based on the content of M, D, T and/or Q siloxy units present therein, as described below.

In specific embodiments, the (A) silicate resin has the average formula:

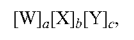

$$[W]_a[X]_b[Y]_c,$$

where 0<a<1; 0<b<1; and 0<c<1; with the proviso that a+b+c=1. Subscripts a, b and c are mole fractions of the W, X and Y units in the (A) silicate resin.

In the average formula above for the (A) silicate resin, [W], [X], and [Y] are utilized in lieu of the more common nomenclature [M], [D], and [Q]. As understood in the art, M siloxy units include one siloxane bond (i.e., —O—Si—); D siloxy units include two siloxane bonds, and Q siloxy units include four siloxane bonds.

However, for purposes of this disclosure, [W] indicates siloxy units including one —Si—O— bond, which may be a siloxane bond or a precursor thereof. Precursors of siloxane bonds are —Si—OZ bonds, where Z is independently H, an alkyl group, or a cation, such as $K^+$ or $Na^+$, alternatively H or an alkyl group. Silanol groups and alkoxy groups can hydrolyze and/or condense to give siloxane bonds and are typically inherently present in most silicone resins. Such precursors of siloxane bonds can be minimized by bodying of silicone resins, which results in further condensation with water and/or an alcohol as a by-product. Thus, for purposes of this disclosure, [W] indicates $[R_3SiO_{1/2}]$, where each R is an independently selected hydrocarbyl group.

Further, for purposes of this disclosure, [X] indicates siloxy units including two —Si—O— bonds, which may independently be siloxane bonds or a precursor thereof. Thus, for purposes of this disclosure, [X] is $[R_2SiO_{1/2}(OZ)]_{b'}[R_2SiO_{2/2}]_{b''}$, where each R is independently selected and defined above; 0≤b'≤b; 0≤b"≤b; with the proviso that b'+b"=b; and wherein each Z is independently H, an alkyl group, or a cation. Subscripts b' and b" indicate the relative mole fraction of [X] siloxy units indicated by subscript b' and those indicated by subscript b", respectively, with the sum of b' and b" being b. In [X] siloxy units indicated by b', there is one siloxane bond and one Si—OZ bond, and in the [X] siloxy units indicated by subscript b", there are two siloxane bonds.

Further, for purposes of this disclosure, [Y] indicates siloxy units including four —Si—O-bonds, which may independently be siloxane bonds or a precursor thereof. Thus, for purposes of this disclosure, [Y] is $[Si(OZ)_{c'}O_{4-c'/2}]$, where each Z is independently selected and defined above, and subscript c' is an integer from 0 to 3 and is independently selected in each siloxy unit indicated by subscript c in the (A) silicate resin. The (A) silicate resin can include siloxy units indicated by subscript c where c' is 0, c' is 1, c' is 2, and c' is 3. The siloxy units represented by [Y] can have one, two, three, or four siloxane bonds, with the balance being Si—OZ moieties.

In certain embodiments, subscript a is from greater than zero to 0.9, alternatively from greater than 0 to 0.8, alternatively from greater than 0 to 0.7, alternatively from greater than 0 to 0.6, alternatively from greater than 0 to 0.5. In specific embodiments, subscript a is from 0.10 to 0.50, alternatively from 0.15 to 0.40, alternatively from 0.25 to 0.35.

In these or other embodiments, subscript b is from greater than zero to 0.9, alternatively from greater than 0 to 0.8, alternatively from greater than 0 to 0.7, alternatively from greater than 0 to 0.6, alternatively from greater than 0 to 0.5, alternatively from greater than 0 to 0.4. In specific embodiments, subscript b is from 0.10 to 0.30, alternatively from 0.15 to 0.30, alternatively from 0.15 to 0.25. Subscripts b' and b" define the relative amounts of particular siloxy units represented by [X]. As noted above, 0≤b'≤b; 0≤b"≤b; with the proviso that b'+b"=b. Subscript b' can be 0 while subscript b" is b, or subscript b' can be b while subscript b" is 0. When both siloxy units indicated by b' and b" are present in the (A) silicate resin, 0<b'<b; 0<b"<b; with the proviso that b'+b"=b.

In these or other embodiments, subscript c is from greater than zero to 0.9, alternatively from greater than 0 to 0.8, alternatively from greater than 0 to 0.7, alternatively from greater than 0 to 0.6. Alternatively, in these or other embodiments, c is from 0.1 to 0.9, alternatively from 0.2 to 0.9, alternatively from 0.3 to 0.9, alternatively from 0.4 to 0.9. In specific embodiments, subscript c is from 0.35 to 0.60, alternatively from 0.40 to 0.55.

R is an independently selected hydrocarbyl group, and an average of at least one, alternatively at least two, R is an ethylenically unsaturated group per molecule of the (A) silicate resin. In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. isopropyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In specific embodiments, each R is independently selected from alkyl groups having from 1 to 32, alternatively from 1 to 28, alternatively from 1 to 24, alternatively from 1 to 20, alternatively from 1 to 16, alternatively from 1 to 12, alternatively from 1 to 8, alternatively from 1 to 4, alternatively 1, carbon atoms, and from ethylenically unsaturated (i.e., alkenyl and/or alkynyl groups) groups having from 2 to 32, alternatively from 2 to 28, alternatively from 2 to 24, alternatively from 2 to 20, alternatively from 2 to 16, alternatively from 2 to 12, alternatively from 2 to 8, alternatively from 2 to 4, alternatively 2, carbon atoms. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of ethylenically unsaturated groups include $CH_2{=}CH—$, $CH_2{=}CHCH_2—$, $CH_2{=}CH(CH_2)_4—$, $CH_2{=}CH(CH_2)_6—$, $CH_2{=}C(CH_3)CH_2—$, $H_2C{=}C(CH_3)—$, $H_2C{=}C(CH_3)—$, $H_2C{=}C(CH_3)CH_2—$, $H_2C{=}CHCH_2CH_2—$, $H_2C{=}CHCH_2CH_2CH_2—$, $HC{\equiv}C—$, $HC{\equiv}CCH_2—$, $HC{\equiv}CCH(CH_3)—$, $HC{\equiv}CC(CH_3)_2—$, and $HC{\equiv}CC(CH_3)_2CH_2—$. Typically, when R is an ethylenically unsaturated group, the ethylenic unsaturation is terminal in R. As understood in the art, ethylenic unsaturation may be referred to as aliphatic unsaturation.

In specific embodiments, only siloxy units indicated by subscript b include R groups having ethylenic unsaturation. In these embodiments, the R groups of siloxy units indicated by subscripts a and c are free of ethylenic unsaturation, and a specific example thereof is methyl. In certain embodiments, the (A) silicate resin includes, as siloxy units indicated by subscript b, both dimethylsiloxy units and methylvinyl siloxy units. In other embodiments, the (A) silicate resin includes, as siloxy units indicated by subscript b, methylvinyl siloxy units but not dimethyl siloxy units. The relative amount of such siloxy units can be selectively controlled when preparing the (A) silicate resin. As understood in the art, the siloxy units set forth above are exemplary only, and methyl may be replaced with other hydrocarbyl groups, and vinyl may be replaced with other ethylenically unsaturated groups.

In certain embodiments, the (A) silicate resin has a content of SiOZ moieties of from 12 to 80, alternatively from 15 to 70, alternatively from 15 to 60, alternatively from 15 to 50, alternatively from 15 to 40, alternatively from 15 to 30, percent based on the total number of moles of Si in each molecule. The content of SiOZ moieties can be calculated via $^{29}$Si-NMR. In particular, the molar content of the following siloxy units in the (A) silicate resin are determined:

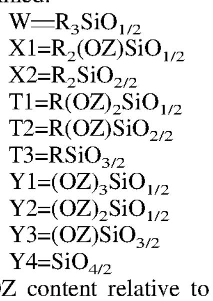

$W{=}R_3SiO_{1/2}$
$X1{=}R_2(OZ)SiO_{1/2}$
$X2{=}R_2SiO_{2/2}$
$T1{=}R(OZ)_2SiO_{1/2}$
$T2{=}R(OZ)SiO_{2/2}$
$T3{=}RSiO_{3/2}$
$Y1{=}(OZ)_3SiO_{1/2}$
$Y2{=}(OZ)_2SiO_{1/2}$
$Y3{=}(OZ)SiO_{3/2}$
$Y4{=}SiO_{4/2}$

OZ content relative to silicon atoms as a mol % can be calculated with the following formula with the label for each peak in the formula corresponding to the integrated area under the peak corresponding to the label:

$$OZ\ \text{content (mol \%)} = 100\times\left(\frac{(X1+2\times T1+T2+3\times Y1+2\times Y2+Y3)}{(W+X1+X2+T1+T2+T3+Y1+Y2+Y3+Y4)}\right)$$

In the embodiment described above, there are no T siloxy units in the (A) silicate resin, but they are included in the calculation above for other embodiments.

In these or other embodiments, the (A) silicate resin has a weight percent of silicon-bonded ethylenically unsaturated groups of from greater than 0 to 10, alternatively from based on the total weight of the (A) silicate resin. The weight percent of silicon-bonded ethylenically unsaturated groups is independent from the viscosity of the (A) silicate resin, which is unlike the weight percent of silicon-bonded ethylenically unsaturated groups of conventional solid silicone resins, which is a function of the viscosity thereof once dispersed in a particular siloxane polymer or vehicle. Thus, the weight percent of silicon-bonded ethylenically unsaturated groups can be increased without impacting viscosity of the (A) silicate resin, for example. The weight percent of silicon-bonded ethylenically unsaturated groups can be selective controlled when preparing the (A) silicate resin, as described below.

In these or other embodiments, the weight percent of silicon-bonded ethylenically unsaturated groups in the (A) silicate resin can be selectively controlled independent from viscosity of the (A) silicate resin. In contrast, in conventional silicone resins including silicon-boned ethylenically unsaturated groups, the content thereof is a function of viscosity, which limits the ability to selectively control content of silicon-bonded ethylenically unsaturated groups at certain viscosities, inherently limiting certain end use applications. In various embodiments, the (A) silicate resin has a weight-average molecular weight of from 1,000 to 100,000, alternatively from 1,000 to 50,000, alternatively from 1,000 to 10,000. Molecular weight may be measured via gel permeation chromatography (GPC) relative to polystyrene standards. In these or other embodiments, the (A) silicate resin has a viscosity at 25° C. of from 10 to 500,000, alternatively from 10 to 250,000, alternatively from 10 to 100,000, cP. Viscosity may be measured at 25° C. via a Brookfield LV DV-E viscometer with a spindle selected as appropriate to the viscosity of the (A) silicate resin, as understood in the art. The viscosity and the molecular weight of the (A) silicate resin can be controlled when preparing the (A) silicate resin.

In various embodiments, the silicate resin is prepared from an MQ resin, where M designates $(R^0SiO_{3/2})$ siloxy units, and Q designates $(SiO_{4/2})$ siloxy units, where $R^0$ designates a silicon-bonded substituent. Such MQ resins are known in the art and are often in solid (e.g. powder or flake) form unless disposed in a solvent. However, typically in the nomenclature utilized in the art, M siloxy units are trimethylsiloxy units, whereas the MQ resin may include hydrocarbyl groups other than methyl groups. Typically, however, the M siloxy units of the MQ resin are trimethylsiloxy units.

The MQ resin may have formula $M_nQ$, where subscript n refers to the molar ratio of M siloxy units to Q siloxy units when the number of moles of Q siloxy units is normalized to 1. The greater the value of n, the lesser the crosslink density of the MQ resin. The inverse is also true, because as the value of n decreases, the number of M siloxy units decreases, and thus more Q siloxy units are networked without termination via an M siloxy unit. The fact that the formula for the MQ resin normalizes the content of Q siloxy units to 1 does not imply that the MQ resin includes only one Q unit. Typically, the MQ resin includes a plurality of Q siloxy units clustered or bonded together. The MQ resin may include, in certain embodiments, up to 4, alternatively up to 3, alternatively up to 2, weight percent of hydroxyl groups.

In specific embodiments, subscript n is <1, e.g. subscript n is from 0.05 to 0.99, alternatively from 0.10 to 0.95, alternatively from 0.15 to 0.90, alternatively from 0.25 to 0.85, alternatively from 0.40 to 0.80. In these embodiments, on a molar basis, there are more Q siloxy units than M siloxy units in the MQ resin. However, n may be >1 in other embodiments, e.g. from >1 to 6, alternatively from >1 to 5, alternatively from >1 to 4, alternatively from >1 to 3, alternatively from >1 to 2.

In specific embodiments, to prepare the (A) silicate resin from the MQ resin, the MQ resin is reacted with a silane compound in the presence of a base catalyst. The silane compound typically includes a silicon-bonded ethylenically unsaturated group and two silicon-bonded alkoxy groups. The silicon-bonded alkoxy groups can be independently selected and typically have from 1 to 10, alternatively from 1 to 8, alternatively from 1 to 6, alternatively from 1 to 4, alternatively 1 or 2, alternatively 1, carbon atom. For example, the silicon-bonded alkoxy groups can be methoxy, ethoxy, propoxy, butoxy, etc. For example, the silane compound can have formula $R_2Si(OR)_2$, where each R is independently selected, and at least one R that is not part of an alkoxy group is an ethylenically unsaturated group.

In the method of preparing the (A) silicate resin, the base catalyst typically cleaves siloxane bonds of the MQ resin, typically between M and Q siloxy units, to give SiOZ groups, where Z is defined above. The silane compound can hydrolyze and condense with the SiOZ groups to be incorporated therein. Both the cleaved siloxy bonds and inclusion of linear siloxy units attributable to the silane compound results in the (A) silicate resin being liquid at 25° C. in the absence of any solvent.

Because the silane compound is incorporated into the (A) silicate resin as D siloxy units, i.e., those indicated by [X] and subscript b, the silane compound may be selected based on desired D siloxy units. For example, with the (A) silicate resin includes methylvinyl siloxy units, the silane compound is a methylvinyldialkoxysilane, e.g. methylvinyldimethoxysilane. When the (A) silicate resin includes dimethylsiloxy units and methylvinylsiloxy units, the silane compound may comprise methylvinyldimethoxysilane in combination with dimethyldimethoxysilane. Thus, the silane compound may comprise two or more different silane compounds in concert.

The relative amount of the silane compound utilized as compared to the MQ resin is a function of the desired subscript b in the (A) silicate resin. When more D siloxy units are desired, more of the silane compound is utilized, as vice versa. One of skill in the art understands how to selectively control such content in view of the description herein, including the Examples which follow this detailed description.

The MQ resin and the silane compound are reacted in the presence of a catalyst. Typically, the catalyst is an acid or a base such that the reaction between the MQ resin and the silane compound is either an acid catalyzed or a base catalyzed reaction. Typically, the reaction is base catalyzed. As such, in certain embodiments, the catalyst may be selected from the group of strong acid catalysts, strong base catalysts, and combinations thereof. The strong acid catalyst may be trifluoromethane sulfonic acid and the like. The catalyst is typically a strong base catalyst. Typically, the strong base catalyst is KOH, although other base catalysts, such as a phosphazene base catalyst, may be utilized.

The phosphazene catalyst, which generally includes at least one —(N═P<)—unit (i.e., a phosphazene unit) and is usually an oligomer having up to 10 such phosphazene units, for example having an average of from 1.5 up to 5 phosphazene units. The phosphazene catalyst may be, for example, a halophosphazene, such as a chlorophosphazene (phosphonitrile chloride), an oxygen-containing halophosphazene, an ionic derivative of a phosphazene such as a phosphazenium salt, particularly an ionic derivative of a phosphonitrile halide such as a perchlorooligophosphazenium salt, or a partially hydrolyzed form thereof.

In specific embodiments, the catalyst comprises a phosphazene base catalyst. The phosphazene base catalyst may be any known in the art but typically has the following chemical formula:

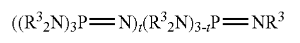

$$((R^3{}_2N)_3P{=}N)_t(R^3{}_2N)_{3-t}P{=}NR^3$$

wherein each $R^3$ is independently selected from the group of a hydrogen atom, R, and combinations thereof, and t is an integer from 1 to 3. If $R^3$ is a R, then $R^3$ is typically an alkyl group having from 1 to 20, alternatively from 1 to 10, alternatively from 1 to 4, carbon atoms. The two $R^3$ groups in the any $(R^3{}_2N)$ moiety may be bonded to the same nitrogen (N) atom and linked to complete a heterocyclic ring preferably having 5 or 6 members.

Alternatively, the phosphazene base catalyst may be a salt and have one of the following alternative chemical formulas:

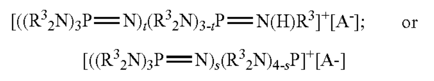

$$[((R^3{}_2N)_3P{=}N)_t(R^3{}_2N)_{3-t}P{=}N(H)R^3]^+[A^-]; \quad \text{or}$$

$$[((R^3{}_2N)_3P{=}N)_s(R^3{}_2N)_{4-s}P]^+[A-]$$

wherein each $R^3$ is independently selected and defined above, subscript t is defined above, subscript s is an integer from 1 to 4, and [A] is an anion and is typically selected from the group of fluoride, hydroxide, silanolate, alkoxide, carbonate and bicarbonate. In one embodiment, the phosphazene base is an aminophosphazenium hydroxide.

In certain embodiments, the MQ resin and the silane compound are reacted at an elevated temperature, e.g. from 75 to 125° C., in the presence of a solvent. Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride. A neutralizing agent, such as acetic acid, may be utilized to neutralize the catalyst after the reaction. One of skill in the art can readily determine a catalytic quantity of the catalyst to be utilized, which is a function of its selection and reaction conditions. The resulting (A) silicate resin can be isolated or recovered from the reaction product via conventional techniques, e.g. stripping or other volatilization techniques.

The base composition comprises the (A) silicate resin in an amount of from greater than 0 to less than 100 weight percent based on the total weight of the base composition. The relative amount of the (A) silicate resin is a function of the end use application of the base composition. When the base composition is utilized to prepare release coating compositions, the content of the (A) silicate resin in the base composition is selected based on desired properties of the release coating composition and release coating prepared therefrom. In certain embodiments, the (A) silicate resin serves as a release modifier in the release coating composition and release coating prepared therefrom.

Typically, the balance of the base composition comprises, alternatively is, component (B), as described below. In certain embodiments, the base composition is substantially free from any solvent, particularly organic solvent. By substantially free, it is meant that the base composition includes organic solvent in an amount of less than 5, alternatively less than 1, alternatively less than 0.5, alternatively less than 0.25, alternatively less than 0.1, alternatively 0, weight percent based on the total weight of the base composition. In addition, as described below, the base composition is typically formed in the absence of any solvent, including organic solvent, such that solvent need not be stripped from a mixture to give the base composition.

The composition further comprises (B) an organopolysiloxane having an average of at least two silicon-bonded ethylenically unsaturated groups per molecule. In certain embodiments, the (B) organopolysiloxane has an average, per molecule, of at least two silicon bonded groups having terminal aliphatic unsaturation. This (B) organopolysiloxane may be linear, branched, partly branched, cyclic, resinous (i.e., have a three-dimensional network), or may comprise a combination of different structures. The polyorganosiloxane may have average formula: $R^4_aSiO_{(4-a)/2}$, where each $R^4$ is independently selected from a monovalent hydrocarbon group or a monovalent halogenated hydrocarbon group, with the proviso that in each molecule, at least two of $R^4$ include aliphatic unsaturation, and where subscript a is selected such that $0<a\leq3.2$. Suitable monovalent hydrocarbon groups and monovalent halogenated hydrocarbon groups for $R^4$ are as described above for R. The average formula above for the polyorganosiloxane may be alternatively written as $(R^4_3SiO_{1/2})_b(R^4_2SiO_{2/2})_c(R^4SiO_{3/2})_d(SiO_{4/2})_e$, where $R^4$ is defined above, and subscripts b, c, d, and e are each independently from $\geq0$ to $\leq1$, with the proviso that a quantity $(b+c+d+e)=1$. One of skill in the art understands how such M, D, T, and Q units and their molar fractions influence subscript a in the average formula above. T units (indicated by subscript d), Q units (indicated by subscript e) or both, are typically present in polyorganosiloxane resins, whereas D units, indicated by subscript c, are typically present in polyorganosiloxane polymers (and may also be present in polyorganosiloxane resins or branched polyorganosiloxanes).

Alternatively, the (B) organopolysiloxane may be substantially linear, alternatively is linear. The substantially linear organopolysiloxane may have the average formula: $R^4_{a'}SiO_{(4-a')/2}$, where each $R^4$ and is as defined above, and where subscript a' is selected such that $1.9\leq a'\leq2.2$.

At 25° C., the substantially linear organopolysiloxane of component (B) may be a flowable liquid or may have the form of an uncured rubber. The substantially linear organopolysiloxane may have a viscosity of from 10 mPa·s to 30,000,000 mPa·s, alternatively from 10 mPa·s to 10,000 mPa·s, alternatively from 100 mPa·s to 1,000,000 mPa·s, and alternatively from 100 mPa·s to 100,000 mPa·s at 25° C. Viscosity may be measured at 25° C. via a Brookfield LV DV-E viscometer with a spindle selected as appropriate to the viscosity of the substantially linear polyorganosiloxane, i.e., RV-1 to RV-7. Typically, component (B) is a flowable liquid at 25° C. for miscibility with component (A).

Alternatively, when the (B) organopolysiloxane is substantially linear or linear, the (B) organopolysiloxane may have the average unit formula: $(R^6R^5_2SiO_{1/2})_{aa}(R^6R^5SiO_{2/2})_{bb}(R^6_2SiO_{2/2})_{cc}(R^5_3SiO_{1/2})_{dd}$, where each $R^5$ is an independently selected monovalent hydrocarbon group that is free of aliphatic unsaturation or a monovalent halogenated hydrocarbon group that is free of aliphatic unsaturation; each $R^6$ is independently selected from the group consisting of alkenyl and alkynyl; subscript aa is 0, 1, or 2, subscript bb is 0 or more, subscript cc is 1 or more, subscript dd is 0, 1, or 2, with the provisos that a quantity $(aa+dd)\geq2$, and $(aa+dd)=2$, with the proviso that a quantity $(aa+bb+cc+dd)$ is 3 to 2,000. Alternatively, subscript $cc\geq0$. Alternatively, subscript bb 2. Alternatively, the quantity $(aa+dd)$ is 2 to 10, alternatively 2 to 8, and alternatively 2 to 6. Alternatively, subscript cc is 0 to 1,000, alternatively 1 to 500, and alternatively 1 to 200. Alternatively, subscript bb is 2 to 500, alternatively 2 to 200, and alternatively 2 to 100.

The monovalent hydrocarbon group for $R^5$ is exemplified by an alkyl group of 1 to 6 carbon atoms, an aryl group of 6 to 10 carbon atoms, a halogenated alkyl group of 1 to 6 carbon atoms, a halogenated aryl group of 6 to 10 carbon atoms, an aralkyl group of 7 to 12 carbon atoms or a halogenated aralkyl group of 7 to 12 carbon atoms, where alkyl, aryl, and halogenated alkyl are as described herein. Alternatively, each $R^5$ is an alkyl group. Alternatively, each $R^5$ is independently methyl, ethyl or propyl. Each instance of $R^5$ may be the same or different. Alternatively, each $R^5$ is a methyl group.

The aliphatically unsaturated monovalent hydrocarbon group for $R^6$ is capable of undergoing hydrosilylation reaction. Suitable aliphatically unsaturated hydrocarbon groups for $R^6$ are exemplified by an alkenyl group as defined herein and exemplified by vinyl, allyl, butenyl, and hexenyl; and alkynyl groups as defined herein and exemplified by ethynyl and propynyl. Alternatively, each $R^6$ may be vinyl or hexenyl. Alternatively, each $R^6$ is a vinyl group. The alkenyl or alkynyl content of the (B) organopolysiloxane may be 0.1% to 1%, alternatively 0.2% to 0.5%, based on the weight of the (B) organopolysiloxane.

When the (B) organopolysiloxane is substantially linear, alternatively is linear, the at least two aliphatically unsaturated groups may be bonded to silicon atoms in pendent positions, terminal positions, or in both pendent and terminal locations. As a specific example of the (B) organopolysiloxane having pendant silicon-bonded aliphatically unsaturated groups, the (B) organopolysiloxane may have the average unit formula: $[(CH_3)_3SiO_{1/2}]_2[(CH_3)_2SiO_{2/2}]_{cc}[(CH_3)ViSiO_{2/2}]_{bb}$, where subscripts bb and cc are defined above, and Vi indicates a vinyl group. With regard to this average formula, any methyl group may be replaced with a different monovalent hydrocarbon group (such as alkyl or aryl), and any vinyl group may be replaced with a different aliphatically unsaturated monovalent hydrocarbon group (such as allyl or hexenyl). Alternatively, as a specific example of the polyorganosiloxane having an average, per molecule, of at least two silicon-bonded aliphatically unsaturated groups, the (B) organopolysiloxane may have the average formula: $Vi(CH_3)_2SiO[(CH_3)_2SiO]_{cc}Si(CH_3)_2Vi$, where subscript cc and Vi are defined above. The dimethyl polysiloxane terminated with silicon-bonded vinyl groups may be used alone or in combination with the dimethyl, methyl-vinyl polysiloxane disclosed immediately above as the (B) organopolysiloxane. With regard to this average formula, any methyl group may be replaced with a different monovalent hydrocarbon group, and any vinyl group may be replaced with any terminally aliphatically unsaturated monovalent hydrocarbon group. Because the at least two silicon-bonded aliphatically unsaturated groups may be both pendent and terminal, the (B) organopolysiloxane may alternatively have the average unit formula: $[Vi(CH_3)_2SiO_{1/2}]_2[(CH_3)_2SiO_{2/2}]_{cc}[(CH_3)ViSiO_{2/2}]_{bb}$, where subscripts bb and cc and Vi are defined above.

When the (B) organopolysiloxane is the substantially linear polyorganosiloxane, the (B) organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

Alternatively, the (B) organopolysiloxane may comprise a substantially linear, alternatively linear, polyorganosiloxane selected from the group consisting of:

i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane), and
xvii) a combination thereof.

Alternatively, the (B) organopolysiloxane may comprise a resinous polyorganosiloxane. The resinous polyorganosiloxane may have the average formula: $R^4_{a''}SiO_{(4-a'')/2}$, where each $R^4$ is independently selected as defined above, and where subscript a" is selected such that $0.5 \leq a'' \leq 1.7$.

The resinous polyorganosiloxane has a branched or a three dimensional network molecular structure. At 25° C., the resinous polyorganosiloxane may be in a liquid or in a solid form. Alternatively, the resinous polyorganosiloxane may be exemplified by a polyorganosiloxane that comprises only T units, a polyorganosiloxane that comprises T units in combination with other siloxy units (e.g. M, D, and/or Q siloxy units), or a polyorganosiloxane comprising Q units in combination with other siloxy units (i.e., M, D, and/or T siloxy units). Typically, the resinous polyorganosiloxane comprises T and/or Q units. Specific example of the resinous polyorganosiloxane include a vinyl-terminated silsesquioxane (i.e., T resin) and a vinyl-terminated MDQ resin.

Alternatively, the (B) organopolysiloxane may comprise a branched siloxane, a silsesquioxane, or both a branched siloxane and a silsesquioxane.

When the (B) organopolysiloxane comprises a blend of different organopolysiloxanes, the blend may be a physical blend or mixture. For example, when the (B) organopolysiloxane comprises the branched siloxane and the silsesquioxane, the branched siloxane and the silsesquioxane are present in amounts relative to one another such that the amount of the branched siloxane and the amount of the silsesquioxane combined total 100 weight parts, based on combined weights of all components present in the composition. The branched siloxane may be present in an amount of 50 to 100 parts by weight, and the silsesquioxane may be present in an amount of 0 to 50 parts by weight. Alternatively, the branched siloxane may be present in an amount 50 to 90 parts by weight and the silsesquioxane may be present in an amount of 10 to 50 parts by weight. Alternatively, the branched siloxane may be present in an amount of 50 to 80 parts by weight and the silsesquioxane may be present in an amount of 20 to 50 parts by weight. Alternatively, the branched siloxane may be present in an amount of 50 to 76 parts by weight and the silsesquioxane may be present in an amount of 24 to 50 parts by weight. Alternatively, the branched siloxane may be present in an amount of 50 to 70 parts by weight and the silsesquioxane may be present in an amount of 30 to 50 parts by weight.

The branched siloxane of the (B) organopolysiloxane may have unit formula: $(R^7_3SiO_{1/2})_p(R^8R^7_2SiO_{1/2})_q(R^7_2SiO_{2/2})_r(SiO_{4/2})_s$, where each $R^7$ is independently a monovalent hydrocarbon group free of aliphatic unsaturation or a monovalent halogenated hydrocarbon group free of aliphatic unsaturation and each $R^8$ is an alkenyl group or an alkynyl group, both of which are as described above, subscript $p \geq 0$, subscript $q > 0$, $15 \geq r \geq 995$, and subscript s is >0.

In the unit formula immediately above, subscript $p \geq 0$. Subscript $q > 0$. Alternatively, subscript $q \geq 3$. Subscript r is from 15 to 995. Subscript s is >0. Alternatively, subscript $s \geq 1$. Alternatively, for subscript p: $22 \geq p \geq 0$; alternatively $20 \geq p \geq 0$; alternatively $15 \geq p \geq 0$; alternatively $10 \geq p \geq 0$; and alternatively $5 \geq p \geq 0$. Alternatively, for subscript q: $22 \geq q > 0$; alternatively $22 \geq q \geq 4$; alternatively $20 \geq q > 0$; alternatively $15 \geq q > 1$; alternatively $10 \geq q \geq 2$; and alternatively $15 \geq q \geq 4$. Alternatively, for subscript r: $800 \geq r \geq 15$; and alternatively $400 \geq r \geq 15$. Alternatively, for subscript s: $10 \geq s > 0$; alternatively, $10 \geq s \geq 1$; alternatively $5 \geq s > 0$; and alternatively s=1. Alternatively, subscript s is 1 or 2. Alternatively, when subscript s=1, subscript p may be 0 and subscript q may be 4.

The branched siloxane may contain at least two polydiorganosiloxane chains of formula $(R^7_2SiO_{2/2})_m$, where each subscript m is independently 2 to 100. Alternatively, the branched siloxane may comprise at least one unit of formula $(SiO_{4/2})$ bonded to four polydiorganosiloxane chains of formula $(R^7_2SiO_{2/2})_o$, where each subscript o is independently 1 to 100. Alternatively, the branched siloxane may have formula:

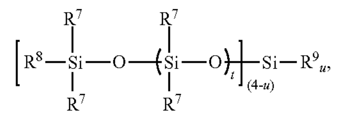

where subscript u is 0 or 1, each subscript t is independently 0 to 995, alternatively 15 to 995, and alternatively 0 to 100;

each $R^9$ is an independently selected monovalent hydrocarbon group, each $R^7$ is an independently selected monovalent hydrocarbon group that is free of aliphatic unsaturation or a monovalent halogenated hydrocarbon group that is free of aliphatic unsaturation as described above, and each $R^8$ is independently selected from the group consisting of alkenyl and alkynyl as described above. Suitable branched siloxanes are exemplified by those disclosed in U.S. Pat. No. 6,806,339 and U.S. Patent Publication 2007/0289495.

In specific embodiments, the branched siloxane has the formula $(R^2_yR^1_{3-y}SiO_{1/2})_x(R^1R^2SiO_{2/2})_z(SiO_{4/2})$, where each $R^1$ is an independently selected hydrocarbyl group free of ethylenic unsaturation; each $R^2$ is independently selected from $R^1$ and an ethylenically unsaturated group, subscript y is independently selected in each siloxy unit indicated by subscript x and is 1 or 2; each; subscript x is from 1.5 to 6; and subscript z is from 3 to 1,000. Specific examples of hydrocarbyl groups free of ethylenic unsaturation and ethylenically unsaturated groups are set forth above for R.

The silsesquioxane may have unit formula: $(R^7_3SiO_{1/2})_i(R^8R^7_2SiO_{1/2})_f(R^7_2SiO_{2/2})_g(R^7SiO_{3/2})_h$, where $R^7$ and $R^8$ are as described above, subscript i≥0, subscript f>0, subscript g is 15 to 995, and subscript h>0. Subscript i may be 0 to 10. Alternatively, for subscript i: 12≥i≥0; alternatively 10≥i≥0; alternatively 7≥i≥0; alternatively 5≥i≥0; and alternatively 3≥i≥0.

Alternatively, subscript f≥1. Alternatively, subscript f≥3. Alternatively, for subscript f: 12≥f>0; alternatively 12≥f≥3; alternatively 10≥f>0; alternatively 7≥f>1; alternatively 5≥f≥2; and alternatively 7≥f≥3. Alternatively, for subscript g: 800≥g≥15; and alternatively 400≥g≥15. Alternatively, subscript h≥1. Alternatively, subscript h is 1 to 10. Alternatively, for subscript h: 10≥h>0; alternatively 5≥h>0; and alternatively h=1. Alternatively, subscript h is 1 to 10, alternatively subscript h is 1 or 2. Alternatively, when subscript h=1, then subscript f may be 3 and subscript i may be 0. The values for subscript f may be sufficient to provide the silsesquioxane of unit formula (ii-II) with an alkenyl content of 0.1% to 1%, alternatively 0.2% to 0.6%, based on the weight of the silsesquioxane. Suitable silsesquioxanes are exemplified by those disclosed in U.S. Pat. No. 4,374,967.

The (B) organopolysiloxane may comprise a combination or two or more different polyorganosiloxanes that differ in at least one property such as structure, molecular weight, monovalent groups bonded to silicon atoms and content of aliphatically unsaturated groups. The composition may comprise the (B) organopolysiloxane in an amount of from 60 to 99.5, alternatively from 60 to 98, alternatively from 60 to 95, alternatively from 70 to 95, alternatively from 75 to 95, weight percent based on the total weight of the composition.

In these or other embodiments, the base composition comprising, alternatively consisting of, the (A) silicate resin and the (B) organopolysiloxane has a viscosity at 25° C. such that the base composition is flowable. For example, in certain embodiments, depending on a selection of components (A) and (B), a 40:60 blend by weight of (A):(B) has a viscosity of from 500 to 100,000, alternatively from 2,000 to 50,000, alternatively from 4,000 to 30,000, centipoise (cP). Viscosity may be measured via a Brookfield LV DV-E viscometer with a spindle selected as appropriate to the viscosity of the base composition. The viscosity ranges above are when the base composition is free from any solvent, including organic solvent.

In these or other embodiments, the same base composition has a weight-average molecular weight of from 500 to 500,000, alternatively from 1,000 to 250,000, alternatively from 10,000 to 150,000. Molecular weight may be measured via gel permeation chromatography (GPC) relative to polystyrene standards.

A method of preparing the base composition is also provided. The method comprises combining the (A) silicate resin and the (B) organopolysiloxane to give the base composition. Typically, the (A) silicate resin is disposed in the (B) organopolysiloxane. However, components (A) and (B) may be combined in any manner, and in any order of addition, optionally with stirring or other mixing. Because the (A) silicate resin is miscible with or in the (B) organopolysiloxane, the method is typically free from any solvent.

A release coating composition comprising the base composition is also provided. The release coating composition further comprises (C) an organosilicon compound having an average of at least two silicon-bonded hydrogen atoms per molecule. The (C) organosilicon compound may be linear, branched, partly branched, cyclic, resinous (i.e., have a three-dimensional network), or may comprise a combination of different structures. The (C) organosilicon compound is typically a cross-linker, and reacts with the ethylenically unsaturated groups of component (B), and, if present, those of component (A), when forming a coating, e.g. a release coating. Typically, the (C) organosilicon compound comprises an organohydrogensiloxane.

The (C) organosilicon compound may comprise any combination of M, D, T and/or Q siloxy units, so long as the (C) organosilicon compound includes at least two silicon-bonded hydrogen atoms per molecule. These siloxy units can be combined in various manners to form cyclic, linear, branched and/or resinous (three-dimensional networked) structures. The (C) organosilicon compound may be monomeric, polymeric, oligomeric, linear, branched, cyclic, and/or resinous depending on the selection of M, D, T, and/or Q units.

Because the (C) organosilicon compound includes an average of at least two silicon-bonded hydrogen atoms per molecule, with reference to the siloxy units set forth above, the (C) organosilicon compound may comprise any of the following siloxy units including silicon-bonded hydrogen atoms, optionally in combination with siloxy units which do not include any silicon-bonded hydrogen atoms: $(R_2HSiO_{1/2})$, $(RH_2SiO_{1/2})$, $(H_3SiO_{1/2})$, $(RHSiO_{2/2})$, $(H_2SiO_{2/2})$, and/or $(HSiO_{3/2})$, where R is independently selected and defined above.

In specific embodiments, the (C) organosilicon compound is a substantially linear, alternatively linear, polyorganohydrogensiloxane. The substantially linear or linear polyorganohydrogensiloxane has unit formula: $(HR^{10}_2SiO_{1/2})_{v'}(HR^{10}SiO_{2/2})_{w'}(R^{10}_2SiO_{2/2})_{x'}(R^{10}_3SiO_{1/2})_{y'}$, where each $R^{10}$ is an independently selected monovalent hydrocarbon group, subscript v' is 0, 1, or 2, subscript w' is 1 or more, subscript x' is 0 or more, subscript y' is 0, 1, or 2, with the provisos that a quantity (v'+y')=2, and a quantity (v'+w') 3. The monovalent hydrocarbon group for $R^{10}$ may be as described above for the monovalent hydrocarbon group for R. A quantity (v'+w'+x'+y') may be 2 to 1,000. The polyorganohydrogensiloxane is exemplified by:

i) dimethylhydrogensiloxy-terminated poly(dimethyl/methylhydrogen)siloxane copolymer,
ii) dimethylhydrogensiloxy-terminated polymethylhydrogensiloxane,
iii) trimethylsiloxy-terminated poly(dimethyl/methylhydrogen)siloxane copolymer,
iv) trimethylsiloxy-terminated polymethylhydrogensiloxane, and/or v) a combination of two or more of i), ii), iii), iv), and v).

Suitable polyorganohydrogensiloxanes are commercially available from Dow Silicones Corporation of Midland, Michigan, USA.

In one specific embodiment, the (C) organosilicon compound is linear and includes pendent silicon-bonded hydrogen atoms. In these embodiments, the (C) organosilicon compound may be a dimethyl, methyl-hydrogen polysiloxane having the average formula;

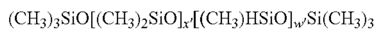

$$(CH_3)_3SiO[(CH_3)_2SiO]_{x'}[(CH_3)HSiO]_{w'}Si(CH_3)_3$$

where x' and w' are defined above. One of skill in the art understands that in the exemplary formula above the dimethylsiloxy units and methylhydrogensiloxy units may be present in randomized or block form, and that any methyl group may be replaced with any other hydrocarbon group free of aliphatic unsaturation.

In another specific embodiment, the (C) organosilicon compound is linear and includes terminal silicon-bonded hydrogen atoms. In these embodiments, the (C) organosilicon compound may be an SiH terminal dimethyl polysiloxane having the average formula:

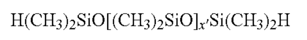

$$H(CH_3)_2SiO[(CH_3)_2SiO]_{x'}Si(CH_3)_2H$$

where x' is as defined above. The SiH terminal dimethyl polysiloxane may be utilized alone or in combination with the dimethyl, methyl-hydrogen polysiloxane disclosed immediately above. When a mixture is utilized, the relative amount of each organohydrogensiloxane in the mixture may vary. One of skill in the art understands that any methyl group in the exemplary formula above may be replaced with any other hydrocarbon group free of aliphatic unsaturation.

Alternatively still, the (C) organosilicon compound may include both pendent and terminal silicon-bonded hydrogen atoms.

In yet another specific embodiment, the (C) organosilicon compound has the formula $H_{y'}R^1_{3-y'}Si—(OSiR^1_2)_m—(OSiR^1H)_{m'}—OSiR^1_{3-y'}H^{y'}$, where each $R^1$ is an independently selected hydrocarbyl group free of ethylenic unsaturation, each y' is independently selected from 0 or 1, subscripts m and m' are each from 0 to 1,000 with the proviso that m and m' are not simultaneously 0 and m+m' is from 1 to 1,000.

In certain embodiments, the (C) organosilicon compound may comprise an alkylhydrogen cyclosiloxane or an alkylhydrogen dialkyl cyclosiloxane copolymer. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl ($—CH_3$).

Other examples of suitable organohydrogensiloxanes for the (C) organosilicon compound are those having at least two SiH containing cyclosiloxane rings in one molecule. Such an organohydrogensiloxane may be any organopolysiloxane having at least two cyclosiloxane rings with at least one silicon-bonded hydrogen (SiH) atom on each siloxane ring. Cyclosiloxane rings contain at least three siloxy units (that is, the minimum needed in order to form a siloxane ring), and may be any combination of M, D, T, and/or Q siloxy units that forms a cyclic structure, provided that at least one of the cyclic siloxy units on each siloxane ring contains one SiH unit, which may be an M siloxy unit, a D siloxy unit, and/or a T siloxy unit. These siloxy units can be represented as MH, DH, and TH siloxy units respectively when other substituents are methyl.

The (C) organosilicon compound may comprise a combination or two or more different organohydrogensiloxanes that differ in at least one property such as structure, molecular weight, monovalent groups bonded to silicon atoms and content of silicon-bonded hydrogen atoms. The release coating composition may comprise the (C) organosilicon compound in an amount to give a molar ratio of silicon-bonded hydrogen atoms in component (C) to silicon-bonded ethylenically unsaturated groups in component (B) (and those of component (A), if present), in an amount of from 1:1 to 5:1, alternatively from 1.1:1 to 3.1.

In certain embodiments, the release coating composition further comprises (D) a hydrosilylation-reaction catalyst. The (D) hydrosilylation-reaction catalyst is not limited and may be any known hydrosilylation-reaction catalyst for catalyzing hydrosilylation reactions. Combinations of different hydrosilylation-reaction catalysts may be utilized.

In certain embodiments, the (D) hydrosilylation-reaction catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the (D) hydrosilylation-reaction catalyst.

Additional examples of catalysts suitable for the (D) hydrosilylation-reaction catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the (D) hydrosilylation-reaction catalyst.

The (D) hydrosilylation-reaction catalyst may be in any suitable form. For example, the (D) hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The (D) hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The (D) hydrosilylation-reaction catalyst may also be disposed in a vehicle, e.g. a solvent which solubilizes the (D) hydrosilylation-reaction catalyst, alternatively a vehicle which merely carries, but does not solubilize, the (D) hydrosilylation-reaction catalyst. Such vehicles are known in the art.

In specific embodiments, the (D) hydrosilylation-reaction catalyst comprises platinum. In these embodiments, the (D)

hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the (D) hydrosilylation-reaction catalyst include 1,3-diethenyl-1,1,3,3-tetramethyldisiloxane complexes with platinum. These complexes may be microencapsulated in a resin matrix. Alternatively, the (D) hydrosilylation-reaction catalyst may comprise 1,3-diethenyl-1,1,3,3-tetramethyldisiloxane complex with platinum. The (D) hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)$PtCl_2$ with 0.045 mole COD and 0.0612 moles $HMeSiCl_2$.

The (D) hydrosilylation-reaction catalyst may also, or alternatively, be a photoactivatable hydrosilylation-reaction catalyst, which may initiate curing via irradiation and/or heat. The photoactivatable hydrosilylation-reaction catalyst can be any hydrosilylation-reaction catalyst capable of catalyzing the hydrosilylation reaction, particularly upon exposure to radiation having a wavelength of from 150 to 800 nanometers (nm).

Specific examples of photoactivatable hydrosilylation-reaction catalysts suitable for the (D) hydrosilylation-reaction catalyst include, but are not limited to, platinum(II) β-diketonate complexes such as platinum(II) bis(2,4-pentanedioate), platinum(II) bis(2,4-hexanedioate), platinum (II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p\text{-}CN—C_6H_4NNNOC_6H_{11}]_4$, $Pt[p\text{-}H_3COC_6H_4NNNOC_6H_{11}]_4$, $Pt[p\text{-}CH_3(CH_2)_x—C_6H_4NNNOCH_3]_4$, 1,5-cyclooctadiene.$Pt[p\text{-}CN—C_6H_4NNNOC_6H_{11}]_2$, 1,5-cyclooctadiene.$Pt[p\text{-}CH_3O—C_6H_4NNNOCH_3]_2$, $[(C_6H_5)_3P]_3Rh[p\text{-}CN—C_6H_4NNNOC_6H_{11}]$, and $Pd[p\text{-}CH_3(CH_2)_x—C_6H_4NNNOCH_3]_2$, where x is 1, 3, 5, 11, or 17; (η-diolefin)(σ-aryl)platinum complexes, such as ($η^4$-1,5-cyclooctadienyl)diphenylplatinum, $η^4$-1,3,5,7-cyclooctatetraenyl)diphenylplatinum, ($η^4$-2,5-norboradienyl)diphenylplatinum, ($η^4$-1,5-cyclooctadienyl)bis-(4-dimethylaminophenyl)platinum, ($η^4$-1,5-cyclooctadienyl)bis-(4-acetylphenyl)platinum, and ($η^4$-1,5-cyclooctadienyl)bis-(4-trifluormethylphenyl)platinum. Typically, the photoactivatable hydrosilylation-reaction catalyst is a Pt(II) β-diketonate complex and more typically the catalyst is platinum(II) bis(2,4-pentanedioate).

The (D) hydrosilylation-reaction catalyst is present in the release coating composition in a catalytic amount, i.e., an amount or quantity sufficient to promote curing thereof at desired conditions. The (D) hydrosilylation-reaction catalyst can be a single hydrosilylation-reaction catalyst or a mixture comprising two or more different hydrosilylation-reaction catalysts.

The catalytic amount of the (D) hydrosilylation-reaction catalyst may be >0.01 ppm to 10,000 ppm; alternatively >1,000 ppm to 5,000 ppm. Alternatively, the typical catalytic amount of the (D) hydrosilylation-reaction catalyst is 0.1 ppm to 5,000 ppm, alternatively 1 ppm to 2,000 ppm, alternatively >0 to 1,000 ppm. Alternatively, the catalytic amount of (D) hydrosilylation-reaction catalyst may be 0.01 ppm to 1,000 ppm, alternatively 0.01 ppm to 100 ppm, alternatively 20 ppm to 200 ppm, and alternatively 0.01 ppm to 50 ppm of platinum group metal; based on the total weight of composition.

The release coating composition may further comprise one or more of: (E) an inhibitor, (F) an anchorage additive, (G) an anti-mist additive, (H) a release modifier, and (I) a vehicle.

In certain embodiments, the release coating composition further comprises the (E) inhibitor. The (E) inhibitor may be used for altering the reaction rate or curing rate of the release coating composition, as compared to a composition containing the same starting materials but with the (E) inhibitor omitted. The (E) inhibitor is exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl ethylenediamine, dialkyl fumarates, dialkenyl fumarates, dialkoxyalkyl fumarates, maleates such as diallyl maleate; nitriles; ethers; carbon monoxide; alkenes such as cyclo-octadiene, divinyltetramethyldisiloxane; alcohols such as benzyl alcohol; and a combination thereof. Alternatively, the (E) inhibitor may be selected from the group consisting of acetylenic alcohols (e.g., 1-ethynyl-1-cyclohexanol) and maleates (e.g., diallyl maleate, bis maleate, or n-propyl maleate) and a combination of two or more thereof.

Alternatively, the (E) inhibitor may be a silylated acetylenic compound. Without wishing to be bound by theory, it is thought that adding a silylated acetylenic compound reduces yellowing of the reaction product prepared from hydrosilylation reaction of the release coating composition as compared to a reaction product from hydrosilylation of a composition that does not contain a silylated acetylenic compound or that contains an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)

trimethylsilane, (3-phenyl-1-butyn-3-oxy) diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, the (E) inhibitor is exemplified by methyl(tris(1,1-dimethyl-2-propynyloxy))silane, ((1,1-dimethyl-2-propynyl)oxy)trimethylsilane, or a combination thereof. The silylated acetylenic compound useful as the (E) inhibitor may be prepared by methods known in the art, such as silylating an acetylenic alcohol described above by reacting it with a chlorosilane in the presence of an acid receptor.

The amount of the (E) inhibitor present in the release coating composition will depend on various factors including the desired pot life of the release coating composition, whether the release coating composition will be a one part composition or a multiple part composition, the particular inhibitor used, and the selection and amount of components (A)-(D). However, when present, the amount of the (E) inhibitor may be 0% to 1%, alternatively 0% to 5%, alternatively 0.001% to 1%, alternatively 0.01% to 0.5%, and alternatively 0.0025% to 0.025%, based on the total weight of the release coating composition.

In certain embodiments, the release coating composition further comprises the (F) anchorage additive. Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Alternatively, the anchorage additive may comprise a polyorganosilicate resin. Suitable anchorage additives and methods for their preparation are disclosed, for example, in U.S. Pat. No. 9,562,149; U.S. Patent Application Publication Numbers 2003/0088042, 2004/0254274, and 2005/0038188; and European Patent 0 556 023.

Further examples of suitable anchorage additives include a transition metal chelate, a hydrocarbonoxysilane such as an alkoxysilane, a combination of an alkoxysilane and a hydroxy-functional polyorganosiloxane, or a combination thereof. The (F) anchorage additive may be a silane having at least one substituent having an adhesion-promoting group, such as an epoxy, acetoxy or acrylate group. The adhesion-promoting group may additionally or alternatively be any hydrolysable group which does not impact the (D) hydrosilylation-reaction catalyst. Alternatively, the (F) anchorage additive may comprise a partial condensate of such a silane, e.g. an organopolysiloxane having an adhesion-promoting group. Alternatively still, the (F) anchorage additive may comprise a combination of an alkoxysilane and a hydroxy-functional polyorganosiloxane.

Alternatively, the (F) anchorage additive may comprise an unsaturated or epoxy-functional compound. The (F) anchorage additive may comprise an unsaturated or epoxy-functional alkoxysilane. For example, the functional alkoxysilane can include at least one unsaturated organic group or an epoxy-functional organic group. Epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. One specific example of an unsaturated compound is vinyltriacetoxysilane.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

The (F) anchorage additive may also comprise the reaction product or partial reaction product of one or more of these compounds. For example, in a specific embodiment, the (F) anchorage additive may comprise the reaction product or partial reaction product of vinyltriacetoxysilane and 3-glycidoxypropyltrimethoxysilane. Alternatively or in addition, the (F) anchorage additive may comprise alkoxy or alkenyl functional siloxanes.

Alternatively, the (F) anchorage additive may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The (F) anchorage additive may comprise a combination of an epoxy-functional alkoxysilane and an epoxy-functional siloxane. For example, the (F) anchorage additive is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the (F) anchorage additive may comprise a transition metal chelate. Suitable transition metal chelates include titanates, zirconates such as zirconium acetylacetonate, aluminum chelates such as aluminum acetylacetonate, and combinations thereof. Alternatively, the (F) anchorage additive may comprise a combination of a transition metal chelate with an alkoxysilane, such as a combination of glycidoxypropyltrimethoxysilane with an aluminum chelate or a zirconium chelate.

The particular amount of the (F) anchorage additive present in the release coating composition, if utilized, depends on various factors including the type of substrate and whether a primer is used. In certain embodiments, the (F) anchorage additive is present in the release coating composition in an amount of from 0 to 2 parts by weight, per 100 parts by weight of component (B). Alternatively, the (F) anchorage additive is present in the release coating composition in an amount of from 0.01 to 2 parts by weight, per 100 parts by weight of component (B).

In certain embodiments, the composition further comprises the (G) anti-mist additive. The (G) anti-mist additive may be utilized in the release coating composition to reduce or suppress silicone mist formation in coating processes, particularly with high speed coating equipment. The (G) anti-mist additive may be a reaction product of an organohydrogensilicon compound, an oxyalkylene compound or an organoalkenylsiloxane with at least three silicon bonded alkenyl groups per molecule, and a suitable catalyst. Suitable anti-mist additives are disclosed, for example, in U.S. Patent Application 2011/0287267; U.S. Pat. Nos. 8,722,153; 6,586,535; and 5,625,023. Alternatively, the (G) anti-mist additive may comprise an MDQ resin, which may optionally include two or more silicon-bonded ethylenically unsaturated groups.

The amount of the (G) anti-mist additive utilized in the release coating composition will depend on various factors including the amount and type of other starting materials selected for the release coating composition. However, the (G) anti-mist additive is typically utilized in an amount of from 0% to 10%, alternatively 0.1% to 3%, based on the total weight of the release coating composition. This amount excludes that associated with component (A), and only relates to the (G) anti-mist additive that is separate and distinct from component (A).

In certain embodiments, the release coating composition further comprises the (H) release modifier, which may be utilized in the release coating composition to control (decrease) the level of release force (the adhesive force between the release coating formed from the release coating composition and an adherend thereto, such as a label including a pressure sensitive adhesive). The (H) release modifier is distinguished from component (A), which also serves as a release modifier when the base composition is utilized to prepare a release coating. Release coatings having the required or desired release force can be formulated from a modifier-free composition by adjusting the level or concentration of the (H) release modifier. Examples of suitable release modifiers for component (H) include trimethylsiloxy-terminated dimethyl, phenylmethylsiloxanes. Alternatively, the (H) release modifier may be a condensation reaction product of an organopolysiloxane resin having hydroxyl or alkoxy groups and a diorganopolysiloxane with at least one hydroxyl or hydrolyzable group. Examples of suitable release modifiers are disclosed, for example, in U.S. Pat. No. 8,933,177 and U.S. Patent Application Publication 2016/0053056. When utilized, the (H) release modifier can be present in the release coating composition in an amount of from 0 to 85 parts by weight, alternatively 25 to 85 parts, per 100 parts of component (B).

In certain embodiments, the release coating composition further comprises the (I) vehicle. The (I) vehicle typically solubilizes the components of the release coating composition and, if the components solubilize, the (I) vehicle may be referred to as a solvent. Suitable vehicles include silicones, both linear and cyclic, organic oils, organic solvents and mixtures of these.

Typically, the (I) vehicle, if present in the release coating composition, is an organic liquid. Organic liquids includes those considered oils or solvents. The organic liquids are exemplified by, but not limited to, aromatic hydrocarbons, aliphatic hydrocarbons, alcohols having more than 3 carbon atoms, aldehydes, ketones, amines, esters, ethers, glycols, glycol ethers, alkyl halides and aromatic halides. Hydrocarbons include isododecane, isohexadecane, Isopar L (C11-C13), Isopar H(C11-C12), hydrogenated polydecene, aromatic hydrocarbons, and halogenated hydrocarbons. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, and octyl palmitate. Additional organic fluids suitable as a stand-alone compound or as an ingredient to the (I) vehicle include fats, oils, fatty acids, and fatty alcohols. The (I) vehicle may also be a low viscosity organopolysiloxane or a volatile methyl siloxane or a volatile ethyl siloxane or a volatile methyl ethyl siloxane having a viscosity at 25° C. in the range of 1 to 1,000 $mm^2$/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl) oxy}trisiloxane pentamethyl{(trimethylsilyl) oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

In specific embodiments, the (I) vehicle is selected from polyalkylsiloxanes; tetrahydrofuran; mineral spirits; naphtha; an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether; or a combination thereof.

The amount of the (I) vehicle will depend on various factors including the type of vehicle selected and the amount and type of other components present in the release coating composition. However, the amount of the (I) vehicle in the release coating composition may be from 0% to 99%, alternatively 0% to 50%, based on the total weight of the release coating composition. The (I) vehicle may be added during preparation of the release coating composition, for example, to aid mixing and delivery. All or a portion of the (I) vehicle may optionally be removed after the release coating composition is prepared, including prior to and/or contemporaneous with preparing the release coating from the release coating composition. Typically, however, the release coating composition is free from the (I) vehicle, and thus the release coating composition is a solventless release coating composition.

Other optional components may be present in the release coating composition, including, for example, reactive diluents, fragrances, preservatives, colorants, dyes, and fillers, for example, silica, quartz or chalk.

Alternatively, the release coating composition and release coating formed therefrom may be free of particulates or contains only a limited amount of particulate (e.g., filler and/or pigment), such as 0 to 30% by weight of the release coating composition. Particulates can agglomerate or otherwise stick to the coater equipment used to form the release coating. In addition, particulates can hinder optical properties, for example transparency, of the release coating and of the release liner formed therewith, if optical transparency is desired. The particulates may be prejudicial to the adherence of an adherend.

In certain embodiments, the release coating composition is free from fluoroorganosilicone compounds. It is believed that, during the cure, a fluorocompound, because of its low surface tension, may rapidly migrate to the interface of the release coating composition or the release coating formed therewith and a substrate on which the release coating composition is applied and the release coating is formed, for example a composition/PET film interface. Such migration may prevent adherence of the release coating (prepared by curing the release coating composition) to the substrate by making a fluorine containing barrier. By making a barrier, the fluoroorganosilicone compounds may prevent any component of the release coating composition from reacting at the interface, impacting curing and related properties. Moreover, fluoroorganosilicone compounds are usually expensive.

The release coating composition may be prepared by combining components (A)-(D), as well as any optional components, described above, in any order of addition, optionally with a master batch, and optionally under shear. In certain embodiments, the release coating composition is prepared by forming the base composition comprising, alternatively consisting of, components (A) and (B), and combining the base composition with components (C) and (D). As described in greater detail below, the release coating composition may be a one part composition, a two component or 2K composition, or a multi-part composition. For example, components (A) and (B) may be a single part of the release coating composition. When the release coating composition is utilized to prepare the release coating or coated substrate, as described below, components (A) and (B) are combined with components (C) and (D), as well as any optional components, such that the release coating composition is a curable composition. When the release coating composition further comprises components (C) and (D), the release coating composition may be referred to as the curable composition.

A method of preparing a coated substrate with the release coating composition comprises applying, i.e., disposing, the release coating composition on the substrate. The method further comprises curing the curable composition on the substrate, which results in the formation of the release coating on the substrate to give the coated substrate. Curing may be performed by heating at an elevated temperature, e.g., 50° C. to 180° C., alternatively 50° C. to 120° C., and alternatively 50° C. to 90° C., to give the coated substrate. One skilled in the art would be able to select an appropriate temperature depending on various factors including the selection of the components in the curable composition and the substrate composition or material of construction.

The curable composition may be disposed or dispensed on the substrate in any suitable manner. Typically, the curable composition is applied in wet form via a wet coating technique. The curable composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x). Typically, disposing the curable composition on the substrate results in a wet deposit on the substrate, which is subsequently cured to give the coated substrate, which comprises a cured film, i.e., the release coating, formed from the curable composition on the substrate.

The substrate is not limited and may be any substrate. The cured film may be separable from the substrate or may be physically and/or chemically bonded to the substrate depending on its selection. The substrate may have an integrated hot plate or an integrated or stand-alone furnace for curing the wet deposit. The substrate may optionally have a continuous or non-continuous shape, size, dimension, surface roughness, and other characteristics. Alternatively, the substrate may have a softening point temperature at the elevated temperature. However, the curable composition and method are not so limited.

Alternatively, the substrate may comprise a plastic, which may be a thermosetting and/or thermoplastic. However, the substrate may alternatively be or comprise glass, metal, cellulose (e.g. paper), wood, cardboard, paperboard, a silicone, or polymeric materials, or a combination thereof.

Specific examples of suitable substrates include paper substrates such as Kraft paper, polyethylene coated Kraft paper (PEK coated paper), thermal paper, and regular papers; polymeric substrates such polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof.

The curable composition, or wet deposit, is typically cured at the elevated temperature for a period of time. The period of time is typically sufficient to effect curing, i.e., cross-linking, of the curable composition. The period of time may be from greater than 0 to 8 hours, alternatively from greater than 0 to 2 hours, alternatively from greater than 0 to 1 hour, alternatively from greater than 0 to 30 minutes, alternatively from greater than 0 to 15 minutes, alternatively from greater than 0 to 10 minutes, alternatively from greater than 0 to 5 minutes, alternatively from greater than 0 to 2 minutes. The period of time depends on various factors including on the elevated temperature is utilized, the temperature selected, desired film thickness, and the presence of absence of any water or vehicle in the curable composition.

Curing the curable composition typically has a dwell time of from 0.1 second to 50 seconds; alternatively from 1 second to 10 seconds; and alternatively from 0.5 second to 30 seconds. Dwell time selected may depend on the substrate selection, temperature selected, and line speed. Dwell time, as used herein, refers to the time during which the curable composition, or wet deposit, is subjected to the elevated temperature. Dwell time is distinguished from cure time, as there may be ongoing curing even after the curable composition, wet deposit, or partially cured reaction intermediary thereof is no longer subjected to the elevated temperature, which typically initiates curing. Alternatively, the coated article may be prepared on a conveyor belt in an oven, and the dwell time may be calculated by dividing a length of the oven (e.g. in meters) by a line speed of the conveyor belt (e.g. in meters/sec).

The period of time may be broken down into cure iterations, e.g. a first-cure and a post-cure, with the first-cure being, for example, one hour and the post cure being, for example, three hours. The elevated temperature may be independently selected from any temperature above room temperature in such iterations, and may be the same in each iteration.

Depending on a thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite is of partially cured layers may be subjected to a final post-cure, e.g. at the elevated temperature and period of time above. Each elevated temperature and period of time may be independently selected and may be the same as or different from one another. When the article is formed via the iterative process, each deposit may also be independently selected and may differ in terms of components selected in the curable composition, their amounts, or both. Alternatively still, each iterative layer may be fully cured, rather than only being partially cured, in such an iterative process.

Alternatively, the deposit may comprise a wet film. Alternatively, the iterative process may be wet-on-wet, depending on a cure state of the partially cured layer. Alternatively, the iterative process may be wet-on-dry.

The coated substrate, which comprises the film formed from the curable composition on the substrate, may have varying dimensions, including relative thicknesses of the film and the substrate. The film has a thickness that may vary depending upon its end use application. The film may have a thickness of greater than 0 to 4,000 μm, alternatively greater than 0 to 3,000 μm, alternatively greater than 0 to 2,000 μm, alternatively greater than 0 to 1,000 μm, alternatively greater than 0 to 500 μm, alternatively greater than 0 to 250 μm. However, other thicknesses are contemplated, e.g. 0.1 to 200 μm. For example, the thickness of the film may be 0.2 to 175 μm; alternatively 0.5 to 150 μm; alternatively 0.75 to 100 μm; alternatively 1 to 75 μm; alternatively 2 to 60 μm; alternatively 3 to 50 μm; and alternatively 4 to 40 μm. Alternatively, when the substrate is plastic, the film may have a thickness of greater than 0 to 200, alternatively greater than 0 to 150 μm, and alternatively greater than 0 to 100 μm.

If desired, the film may be subjected to further processing depending upon its end use application. For example, the film may be subjected to oxide deposition (e.g. $SiO_2$ deposition), resist deposition and patterning, etching, chemical, corona, or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability. Depending on an end use of the film, however, the film may be utilized with such further processing.

The coated substrate may be utilized in diverse end use applications. For example, the coated substrate may be utilized in coating applications, packaging applications, adhesive applications, fiber applications, fabric or textile applications, construction applications, transportation applications, electronics applications, or electrical applications. However, the curable composition may be utilized in end use applications other than preparing the coated substrate, e.g. in the preparation of articles, such as silicone rubbers.

Alternatively, the coated substrate may be utilized as a release liner, e.g. for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may having a film disposed thereon for double sided tapes or adhesives.

Alternatively, when the curable composition will be formulated as a release coating composition, e.g. for forming a release coating or liner, the release coating composition may be prepared by mixing the components together, for example, to prepare a one part composition. However, it may be desirable to prepare a release coating composition as a multiple part composition, in which components having SiH functionality (e.g., the (C) organosilicon compound) and the (D) hydrosilylation-reaction catalyst are stored in separate parts, until the parts are combined at the time of use (e.g., shortly before application to a substrate). When the curable composition is the release coating composition, the release coating composition can utilized to form the coated substrate as described above, and the release coating is formed by applying and curing the release coating composition on the substrate, e.g. a surface of the substrate.

For example, a multiple part curable composition may comprise:

Part (A), a base part comprising the (A) silicate resin, the (B) organopolysiloxane including an average of at least two silicon-bonded ethylenically unsaturated groups per molecule, and (D) the hydrosilylation-reaction catalyst, and optionally when present, one or more of, the (F) anchorage additive, and the (1) vehicle, and Part (B), a curing agent part comprising the (C) organosilicon compound having an average, per molecule, of at least two silicon bonded hydrogen atoms per molecule, and optionally when present, the (F) anchorage additive and/or the (1) vehicle. When utilized, the (E) inhibitor may be added to either Part (A), Part (B), or both. Part (A) and Part (B) may be combined in a weight ratio (A):(B) of 1:1 to 30:1, alternatively 1:1 to 10:1, alternatively 1:1 to 5:1, and alternatively 1:1 to 2:1. Part (A) and Part (B) may be provided in a kit with instructions, e.g., for how to combine the parts to prepare the release coating composition, how to apply the release coating composition to a substrate, and how to cure the release coating composition.

Alternatively, when the (F) anchorage additive is present, it can be incorporated in either of Part (A) or Part (B), or it can be added in a separate (third) part.

The release coating composition can for example be applied to the substrate by any convenient means such as spraying, doctor blade, dipping, screen printing or by a roll coater, e.g. an offset web coater, kiss coater or etched cylinder coater.

The release coating composition of the invention can be applied to any substrate, such as those described above. Alternatively, the release coating composition may be applied to polymer film substrates, for example polyester, particularly polyethylene terephthalate (PET), polyethylene, polypropylene, or polystyrene films. The release coating composition can alternatively be applied to a paper substrate, including plastic coated paper, for example paper coated with polyethylene, glassine, super calender paper, or clay coated kraft. The release coating composition can alternatively be applied to a metal foil substrate, for example aluminum foil.

In certain embodiments, the method of preparing the coated substrate may further comprise treating the substrate before applying or disposing the release coating composition on the substrate. Treating the substrate may be performed by any convenient means such as a plasma treatment or a corona discharge treatment. Alternatively, the substrate may be treated by applying a primer. In certain instances, anchorage of the release coating may be improved if the substrate is treated before forming the release coating thereon from the release coating composition.

When the release coating composition includes the (I) vehicle, the method may further comprise removing the (I) vehicle, which may be performed by any conventional means, such as heating at 50° C. to 100° C. for a time sufficient to remove all or a portion of the (I) vehicle. The method may further comprise curing the release coating composition to form the release coating on a surface of the substrate. Curing may be performed by any conventional means such as heating at 100° C. to 200° C.

Under production coater conditions, cure can be effected in a residence time of 1 second to 6 seconds, alternatively 1.5 seconds to 3 seconds, at an air temperature of 120° C. to 150° C. Heating can be performed in an oven, e.g., an air circulation oven or tunnel furnace or by passing the coated film around heated cylinders.

The following examples are intended to illustrate the invention and are not to be viewed in any way as limiting to the scope of the invention. Certain components utilized in the Examples are set forth in Table 1 below, followed by characterization and evaluation procedures also used in the Examples.

TABLE 1

| Components | |
|---|---|
| Component | Chemical Description |
| Silicate Resin (A1) | $W_{0.321}X^{Vi}_{0.184}Y_{0.495}$ |
| Silicate Resin (A2) | $W_{0.300}X^{Vi}_{0.222}Y_{0.478}$ |
| Silicate Resin (A3) | $W_{0.319}X^{Vi}_{0.251}Y_{0.435}$ |
| Silicate Resin (A4) | $W_{0.289}X_{0.170}X^{Vi}_{0.031}Y_{0.511}$ |
| Silicate Resin (A5) | $W_{0.256}X_{0.209}X^{Vi}_{0.030}Y_{0.504}$ |
| Silicate Resin (A6) | $W_{0.265}X_{0.237}X^{Vi}_{0.007}Y_{0.492}$ |
| W | $(CH_3)_3SiO_{1/2}$ |
| $X^{Vi}$ | $[MeViSiO_{1/2}(OZ)]$ and $[MeViSiO_{2/2}]$ |
| X | $[Me_2SiO_{1/2}(OZ)]$ and $[Me_2SiO_2/_2]$ |
| Y | $[SiO_{1/2}(OZ)_3]$, $[SiO_{2/2}(OZ)_2]$, $[SiO_3/_2(OZ)]$, and $[SiO_{4/2}]$ |
| OZ | OH or OMe |
| MQ Resin | $[Me_3SiO_{1/2}]_{0.43}[SiO_{4/2}]_{0.57}$ |
| Silane Compound 1 | Vinylmethyldimethoxysilane |
| Silane Compound 2 | Dimethyldimethoxysilane |
| Catalyst | KOH |
| Neutralizing Agent | Acetic Acid |

TABLE 1-continued

| Components | |
|---|---|
| Component | Chemical Description |
| Organopolysiloxane (B1) | Vinyl end-blocked Q-branched polymer of formula: $M^{Vi}_4D_{220}Q$ |
| Organopolysiloxane (A-C1) | Physical blend of $M_{41}M^{Vi}_5Q_{54}$ and Organopolysiloxane (B1) in a wt./wt. ratio of 1.515/1. |
| Organopolysiloxane (A-C2) | Physical blend of $M_{41}M^{Vi}_5Q_{54}$, Q-$(D_5M^{Vi})_4$, and Inhibitor (E1) in a wt./wt./wt. ratio of 41.3/58.5/0.2. |
| Organopolysiloxane (A-C3) | Physical blend of $M_{41}M^{Vi}_5Q_{54}$, Inhibitor (E1), and 1-tetradecene in a wt./wt./wt. ratio of 78.68/0.15/21.77. |
| Inhibitor (E1) | Ethynyl cyclohexanol ($HC\equiv CC_6H_{10}OH$) |
| Solvent 1 | Toluene ($C_7H_8$) |
| Organosilicon Compound (C1) | $Me_3Si$-terminated dimethyl methylhydrogen copolymer ($MD_{18}D^{Me,H}_{42}M$) |
| Catalyst (D1) | Karstedt's catalyst in vinyl-functional siloxane. |

Nuclear Magnetic Resonance Spectroscopy (NMR)

Nuclear magnetic resonance (NMR) spectra are obtained on a NMR BRUKER AVIII (400 MHz), using a silicon-free 10 mm tube and $CDCl_3/Cr(AcAc)_3$ solvent. Chemical shifts for $^{29}$Si-NMR spectra are referenced to internal solvent resonance and are reported relative to tetramethylsilane.

Gel Permeation Chromatography (GPC)

Gel permeation chromatography (GPC) analysis is conducted on an Agilent 1260 Infinity II chromatograph equipped with a triple detector composed of a differential refractometer, an online differential viscometer, a low angle light scattering (LALS: 15° and 90° angles of detection), and a column (2 PL Gel Mixed C, Varian). Toluene (HPLC grade, Biosolve) is used as mobile phase, at a flow rate of 1 mL/min.

Dynamic Viscosity (DV)

Dynamic viscosity (DV) is measured with a Brookfield DV-Ill Ultra Programmable Rheometer equipped with a CPA-52Z spindle, using a sample volume of 0.5 mL, at a temperature of 25° C.

X-Ray Fluorescence (XRF)

X-Ray Fluorescence (XRF) is conducted on an Oxford Instruments Lab-X 3500 Benchtop XRF analyzer.

SiOZ Content

The content of SiOZ moieties can be calculated via $^{29}$Si-NMR. In particular, the molar content of the following siloxy units in each (A) silicate resin are determined:

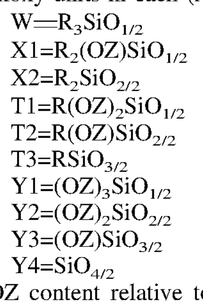

$W = R_3SiO_{1/2}$ $X1 = R_2(OZ)SiO_{1/2}$ $X2 = R_2SiO_{2/2}$ $T1 = R(OZ)_2SiO_{1/2}$ $T2 = R(OZ)SiO_{2/2}$ $T3 = RSiO_{3/2}$ $Y1 = (OZ)_3SiO_{1/2}$ $Y2 = (OZ)_2SiO_{2/2}$ $Y3 = (OZ)SiO_{3/2}$ $Y4 = SiO_{4/2}$

OZ content relative to silicon atoms as a mol % can be calculated with the following formula with the label for each peak in the formula corresponding to the integrated area under the peak corresponding to the label:

$$OZ\ \text{content (mol \%)} =$$

-continued $$100\times\left(\frac{(X1+2\times T1+T2+3\times Y1+2\times Y2+Y3)}{W+X1+X2+T1+T2+T3+Y1+Y2+Y3+Y4)}\right)$$

R in the Examples can be methyl or vinyl.

Cure Performance: Extractable Percentage

Cure performance of a sample composition is evaluated by determining an extractable percent value (extractable %). In particular, a sample composition is coated and cured on a substrate (Glassine paper) to form a coated substrate, which is immediately cut into three sample discs (die cutter, 1.375 inch (3.49 cm)) handled only by tweezers to minimize contamination and/or damage. Each sample disc is analyzed via XRF to determine an initial coat weight ($W^i_s$) before being placed in an individual bottle (100-mL, covered with a lid) containing solvent (methyl isobutyl ketone, 40 mL) and allowed to rest on a bench to soak for 30 minutes. Each sample disc is then removed from the bottle, placed coated-side-up on a clean surface (tissue paper) to allow residual solvent to evaporate (without blotting/wiping), and analyzed via XRF to determine a final coat weight ($W^f_s$). The extractable % of each sample is the percent change in coat weight from the solvent soak, i.e., is calculated using the formula: $[(W^i_s-W^f_s)/Wi]\times100\%)$. The extractable % indicates the amount of non-cured components of the sample composition (e.g. non-crosslinked silicone) extractable from the coated substrate, such as a lower extractable % indicates a higher/better cure performance.

Cure Performance: Anchorage (ROR %)

The anchorage of a sample composition is evaluated via anchorage index, i.e., by determining a percent rub-off resistance (ROR %) value. In particular, a sample composition is coated and cured on a substrate (Glassine paper) to form a coated substrate. Immediately following cure, the coated substrate is cut into two sample discs (die cutter, 1.375 inch (3.49 cm)), which are each analyzed via XRF to determine an initial coat weight ($W^i_a$). Each sample disc is then abraded with a felt under load (1.9 kg) using automated abrading equipment, in a method similar to a Taber-type abrasion test (e.g. such as that of ASTM D4060-19, "Standard Test Method for Abrasion Resistance of Organic Coatings by the Taber Abraser"), and subsequently analyzed via XRF to determine a final coat weight ($W^f_a$). The ROR % of each sample is calculated using the formula: $[W^f_s/W^i_s]\times100\%)$. The ROR % indicates how strong the coating is anchored to the substrate, such that a higher ROR % indicates a higher/better anchorage the higher the ROR % value the better.

Preparation Example 1: Silicate Resin (A1)

300 g of Solvent 1, followed by 300 g of MQ Resin were disposed in a 2 L flask equipped with a magnetic stir-bar. 109.0 grams of Silane Compound 1 and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.5 grams of Neutralizing Agent were disposed in the flask to neutralize the Catalyst. The reaction product in the flask was filtered through a 1 micron filter to give a clear and viscous liquid. Silicate Resin (A1) was isolated from the reaction product through removal of volatiles via roto-vap. Silicate Resin (A1) was a colorless liquid having a DV of 39,000 cP at 25° C., a weight-average molecular weight of 2,969, and a polydispersity of 1.46, each as measured via GPC. The (A1) Silicate Resin had an SiOZ content of 23.5 mole % and a vinyl content of 6.46 wt. %.

Preparation Example 2: Silicate Resin (A2)

300 g of Solvent 1, followed by 300 g of MQ Resin were disposed in a 2 L flask equipped with a magnetic stir-bar. 165.0 grams of Silane Compound 1 and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.5 grams of Neutralizing Agent were disposed in the flask to neutralize the Catalyst. The reaction product in the flask was filtered through a 1 micron filter to give a clear and viscous liquid. Silicate Resin (A2) was isolated from the reaction product through removal of volatiles via roto-vap. Silicate Resin (A2) was a colorless liquid having a DV of 450 cP at 25° C., a weight-average molecular weight of 3,160, and a polydispersity of 1.65, each as measured via GPC. The (A2) Silicate Resin had an SiOZ content of 30.9 mole % and a vinyl content of 7.58 wt. %.

Preparation Example 3: Silicate Resin (A3)

300 g of Solvent 1, followed by 300 g of MQ Resin were disposed in a 2 L flask equipped with a magnetic stir-bar. 217.9 grams of Silane Compound 1 and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.5 grams of Neutralizing Agent were disposed in the flask to neutralize the Catalyst. The reaction product in the flask was filtered through a 1 micron filter to give a clear and viscous liquid. Silicate Resin (A3) was isolated from the reaction product through removal of volatiles via roto-vap. Silicate Resin (A3) was a colorless liquid having a DV of 200 cP at 25° C., a weight-average molecular weight of 2,636 and a polydispersity of 1.50, each as measured via GPC. The (A3) Silicate Resin had an SiOZ content of 37.3 mole % and a vinyl content of 8.26 wt. %.

Preparation Example 4: Silicate Resin (A4)

300 g of Solvent 1, followed by 300 g of MQ Resin were disposed in a 2 L flask equipped with a magnetic stir-bar. 20.16 grams of Silane Compound 1, 105.3 grams of Silane Compound 2, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.36 grams of Neutralizing Agent were disposed in the flask to neutralize the Catalyst. The reaction product in the flask was filtered through a 0.45 micron filter to give a clear and viscous liquid. Silicate Resin (A4) was isolated from the reaction product through removal of volatiles via roto-vap. Silicate Resin (A4) was a colorless liquid having a DV of 75,000 cP at 25° C., a weight-average molecular weight of 5,450 and a polydispersity of 1.7149, each as measured via GPC. The (A4) Silicate Resin had an SiOZ content of 19.12 mole % and a vinyl content of 1.12 wt. %.

Preparation Example 5: Silicate Resin (A5)

300 g of Solvent 1, followed by 300 g of MQ Resin were disposed in a 2 L flask equipped with a magnetic stir-bar. 20.2 grams of Silane Compound 1, 131.1 grams of Silane Compound 2, and 0.30 grams of Catalyst were disposed in the flask. The contents of the flask were stirred at 100° C. under nitrogen, with progress of the reaction in the flask monitored via GC. After 10 hours, the contents of the flask were cooled to 23° C., and 0.5 grams of Neutralizing Agent were disposed in the flask to neutralize the Catalyst. The reaction product in the flask was filtered through a 0.45 micron filter to give a clear and viscous liquid. Silicate Resin (A5) was isolated from the reaction product through removal of volatiles via roto-vap. Silicate Resin (A5) was a colorless liquid having a DV of 9,500 cP at 25° C., a weight-average molecular weight of 7,380 and a polydispersity of 1.8996, each as measured via GPC. The (A5) Silicate Resin had an SiOZ content of 25.33 mole % and a vinyl content of 1.09 wt. %.

Preparation Example 6: Silicate Resin (A6)

The same method as that of Preparation Example 5 was repeated. Silicate Resin (A6) was a colorless liquid having a DV of 9,900 cP at 25° C., a weight-average molecular weight of 5,820 and a polydispersity of 1.7562, each as measured via GPC. The (A6) Silicate Resin had an SiOZ content of 25.35 mole % and a vinyl content of 0.24 wt. %.

Examples 1-11

Examples 1-11 are release coating compositions comprising the silicate resins prepared in Preparation Examples 1-6. In each of Examples 1-11, the particular Silicate Resin is combined with the (B1) Organopolysiloxane to give a Base Composition, and each particular Base Composition is combined with Inhibitor 1, Organosilicon Compound (C1), and Catalyst (D1) to give a release coating composition. Each release coating composition of Examples 1-11 is solventless and prepared in the absence of any solvent as the Silicate Resins are miscible with the (B1) Organopolysiloxane. In each of Examples 1-11, the SiH:SiVi molar ratio is 2:1 mol:mol, and the total Pt content in each of Examples 1-11 is 100 ppm. Table 2 below sets forth the relative amounts of each component in grams utilized to prepare the release coating compositions of Examples 1-11.

TABLE 2

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| (B1) | 19.66 | 11.3 | 7.12 | 19.2 | 10.39 | 5.98 | 18.97 | 9.91 | 15.64 | 15.67 | 16.36 |
| (E1) | 0.07 | 0.07 | 0.07 | 0.07 | 0.07 | 0.07 | 0.07 | 0.07 | 0.07 | 0.07 | 0.07 |
| (D1) | 0.58 | 0.58 | 0.58 | 0.58 | 0.58 | 0.58 | 0.58 | 0.58 | 0.58 | 0.58 | 0.58 |
| (A1) | 5.99 | 11.97 | 14.97 | 0 | 0 | 0 | 0 | 0 | 0 | 0 | 0 |
| (A2) | 0 | 0 | 0 | 5.99 | 11.97 | 14.97 | 0 | 0 | 0 | 0 | 0 |
| (A3) | 0 | 0 | 0 | 0 | 0 | 0 | 5.99 | 11.97 | 0 | 0 | 0 |
| (A4) | 0 | 0 | 0 | 0 | 0 | 0 | 0 | 0 | 11.97 | 0 | 0 |
| (A5) | 0 | 0 | 0 | 0 | 0 | 0 | 0 | 0 | 0 | 11.97 | 0 |
| (A6) | 0 | 0 | 0 | 0 | 0 | 0 | 0 | 0 | 0 | 0 | 11.97 |
| (C1) | 3.71 | 6.08 | 7.27 | 4.17 | 7 | 8.41 | 4.4 | 7.47 | 1.74 | 1.37 | 1.02 |

Comparative Examples 1-9

Comparative Examples 1-9 (labeled as C.E. 1-9) are comparative release coating compositions. In each of Comparative Examples 1-9, the SiH:SiVi molar ratio is 2:1 mol:mol, and the total Pt content in each of Comparative Examples 1-9 is 100 ppm. Table 3 below sets forth the relative amounts of each component in grams utilized to prepare the comparative release coating compositions of Comparative Examples 1-9.

TABLE 3

| | C.E. 1 | C.E. 2 | C.E. 3 | C.E. 4 | C.E. 5 | C.E. 6 | C.E. 7 | C.E. 8 | C.E. 9 |
|---|---|---|---|---|---|---|---|---|---|
| (B1) | 28.01 | 22.74 | 17.47 | 12.2 | 6.93 | 1.65 | 14.74 | 20.94 | 13.87 |
| (E1) | 0.07 | 0.07 | 0.07 | 0.07 | 0.07 | 0.07 | 0.07 | 0.07 | 0.07 |
| (D1) | 0.58 | 0.58 | 0.58 | 0.58 | 0.58 | 0.58 | 0.58 | 0.58 | 0.58 |
| (A-C1) | 0 | 4.99 | 9.98 | 14.97 | 19.95 | 24.94 | 0 | 0 | 0 |
| (A-C2) | 0 | 0 | 0 | 0 | 0 | 0 | 0 | 5.99 | 11.97 |
| (A-C3) | 0 | 0 | 0 | 0 | 0 | 0 | 11.98 | 0 | 0 |
| (C1) | 1.33 | 1.62 | 1.9 | 2.19 | 2.47 | 2.75 | 2.65 | 2.42 | 3.51 |

Examples 12-22 & Comparative Examples 10-18: Coated Substrates

The release coating compositions of Examples 1-11 and Comparative Examples 1-9 utilized to prepare coated substrates. In particular, each composition is coated onto a substrate (Glassine paper) and cured (exit web oven temperature: 165.56° C.; dwell time: 28.4 s) to form a coated substrate, samples of which are evaluated for immediate extractable %, immediate ROR %, 7 days RT aged ROR %, and 1 month RT aged ROR %. The 7 days and 1 month RT aged ROR % is conducted after aging at RT for the designed time at 50% RH under 40 lbs. The results are set forth below in Tables 4 and 5. In tables 4 and 5, n/a indicates a value was not measured. Example 12 utilizes the composition of Example 1; Examples 13 utilizes the composition of Example 2; Example 14 utilizes the composition of Example 3; and so on. The same is true for the correlation of Comparative Examples 10-18 to the compositions of Comparative Examples 1-Table 4:

TABLE 4

| Property: | 12 | 13 | 14 | 15 | 16 | 17 | 18 | 19 | 20 | 21 | 22 |
|---|---|---|---|---|---|---|---|---|---|---|---|
| Extractable % | 0 | 0 | 0 | 0 | 0.96 | 0 | 0.35 | 1.3 | 5.55 | 5.01 | 5.44 |
| ROR % | 97.6 | 99.4 | 97.7 | 98.7 | 98.2 | 99.6 | 98.5 | 93 | 95.5 | 94.37 | 90.2 |
| 7 days RT aged ROR % | n/a | n/a | n/a | n/a | n/a | n/a | n/a | n/a | 97.35 | 94.98 | 89.56 |
| 1 month RT aged ROR % | 98 | 98.4 | 100 | 100 | 99.6 | 99.2 | 98.6 | 100 | 94 | 92.22 | 90 |

TABLE 5

| Property: | C.E. 10 | C.E. 11 | C.E. 12 | C.E. 13 | C.E. 14 | C.E. 15 | C.E. 16 | C.E. 17 | C.E. 18 |
|---|---|---|---|---|---|---|---|---|---|
| Extractable % | 4.53 | 0.35 | 1.24 | 0.4 | 3.59 | 1.71 | 6.5 | 6.4 | 6.95 |
| ROR % | 93.87 | 96.83 | 98.44 | 95 | 96.3 | 95 | 96 | 100 | 97.6 |
| 7 days RT aged ROR % | 93.47 | n/a | n/a | n/a | n/a | n/a | 92.4 | n/a | n/a |
| 1 month RT aged ROR % | 94.71 | 98.55 | 98.64 | 100 | 99.6 | 99.5 | n/a | 99 | 99.5 |

Release force, 7 day aged release force, and 1 month aged release force was measured at various speeds, namely at 0.3 m/min (MPM), 10 n/mm (MPM), 100 n/mm (MPM), and 300 in/mm (MPM), at 180 degree peeling. Release force was measured via an mass SP-2100 and ZPE-1100W release test system after lamination with Tesa 7475 standard tape under 40 lbs at RT and 50% RH. Aged release force is measured by aging at RT and 50% RH under 40 lbs for the designated time. The values are set forth below in Tables 6-8. In Tables 6-8, TH indicates the release force is too high for measurement, and n/a indicates no measurement was taken.

TABLE 6

| Immediate Release Performance | | | | |
|---|---|---|---|---|
| | 0.3 m/min | 7.62 m/min | 100 m/min | 300 m/min |
| C.E. 10 | 33.3 | 54.09 | 103.04 | 64.32 |
| C.E. 16 | 40.43 | 83.33 | 119 | 73.4 |
| 20 | 24.96 | 71.42 | 173.43 | 112.9 |
| 21 | 17.64 | 52.37 | 97.02 | 60.96 |
| 22 | 18.03 | 62.92 | 153.2 | 91.03 |

TABLE 7

| 7 Days RT Aged Release Performance | | | | |
|---|---|---|---|---|
| | 0.3 m/min | 10 m/min | 100 m/min | 300 m/min |
| C.E. 10 | 16.29 | 47.05 | 77.56 | 71.16 |
| C.E. 11 | 41.88 | 78.13 | 131.97 | 101.01 |
| C.E. 12 | 52.63 | 97.81 | 159.76 | 104.17 |
| C.E. 13 | 38.98 | 86.47 | 110.28 | 106.21 |
| C.E. 14 | 78.82 | 138.95 | 135.78 | 158.25 |
| C.E. 15 | 130.87 | 197.93 | 170.62 | 92.2 |
| C.E. 17 | 40.9 | 60.72 | 71.03 | 69.46 |
| C.E. 18 | 50.96 | 64.61 | 88.82 | 58.21 |
| 12 | 101.9 | 126.92 | 162.86 | 151.06 |
| 13 | 177.33 | 219.55 | 195.32 | 144.76 |
| 14 | 271.21 | 227.55 | 268.22 | 106.46 |
| 15 | 165.72 | 212.22 | 254.65 | 267.99 |
| 16 | 304.38 | 376.33 | TH | 305.54 |
| 17 | 436.27 | TH | TH | 263.34 |
| 18 | 160.04 | 204.98 | 241.82 | TH |

TABLE 7-continued

| 7 Days RT Aged Release Performance | | | | |
|---|---|---|---|---|
| | 0.3 m/min | 10 m/min | 100 m/min | 300 m/min |
| 19 | 300.68 | 345.38 | TH | TH |
| 20 | 134.23 | 194.23 | 251.41 | 236.39 |
| 21 | 93.1 | 142.74 | 209.37 | 216.78 |
| 22 | 34.73 | 104.45 | 203.07 | 145.04 |

TABLE 8

| 1 Month RT Aged Release Performance | | | | |
|---|---|---|---|---|
| | 0.3 m/min | 10 m/min | 100 m/min | 300 m/min |
| C.E. 10 | 24.3 | 58.38 | 85.46 | 70.43 |
| C.E. 11 | 52.29 | 79.07 | 115.73 | 101.4 |
| C.E. 12 | 60.39 | 101.82 | 128.83 | 129.21 |
| C.E. 13 | 76.69 | 108.63 | 163.08 | 119.51 |
| C.E. 14 | 104.12 | 111.19 | 189.24 | 139.41 |
| C.E. 15 | 174.04 | 239.35 | 181.84 | 108.5 |
| C.E. 17 | 46.23 | 75.91 | 98.65 | 65.74 |
| C.E. 18 | 56.87 | 75.61 | 101.53 | 73.31 |
| 12 | 104.7 | 134.35 | 207.67 | 168.49 |
| 13 | 264.31 | n/a | 212.47 | 216.4 |
| 14 | 378.06 | 325.52 | 252.76 | 163.92 |
| 15 | 174.4 | 208.05 | 243.83 | 259.65 |
| 16 | 281.49 | 398.72 | 357.2 | 291.1 |
| 17 | 422.89 | TH | TH | TH |
| 18 | 176.72 | TH | 289.83 | n/a |
| 19 | 312.72 | TH | 337.26 | 175.21 |
| 20 | 132.77 | 202.35 | 290.33 | 244.89 |
| 21 | 107.43 | 152.14 | 253.24 | 229.42 |
| 22 | 56.33 | 125.51 | 281.12 | 185.35 |

Examples 23-25

Examples 23-25 are further release coating compositions comprising the silicate resins prepared in Preparation Examples 1-3. In each of Examples 23-25, the particular Silicate Resin is combined with the (B1) Organopolysiloxane to give a Base Composition, and each particular Base Composition is combined with Inhibitor 1, Organosilicon Compound (C1), and Catalyst (D1) to give a release coating composition. Each release coating composition of Examples 23-25 is solventless and prepared in the absence of any solvent as the Silicate Resins are miscible with the (B1) Organopolysiloxane. Table 9 below sets forth the relative amounts of each component in grams utilized to prepare the release coating compositions of Examples 23-25.

TABLE 9

| | 23 | 24 | 25 |
|---|---|---|---|
| (B1) | 10.19 | 11.29 | 9.91 |
| (E1) | 0.07 | 0.07 | 0.07 |
| (D1) | 0.58 | 0.58 | 0.58 |
| (A1) | 11.97 | 0 | 0 |
| (A2) | 0 | 11.97 | 0 |
| (A3) | 0 | 0 | 11.97 |
| (C1) | 7 | 6.08 | 7.47 |

Comparative Examples 19-20

Comparative Examples 19-20 (labeled as C.E. 19-20) are comparative release coating compositions. Table 10 below sets forth the relative amounts of each component in grams utilized to prepare the comparative release coating compositions of Comparative Examples 19-20.

TABLE 10

| | C.E. 19 | C.E. 20 |
|---|---|---|
| (B1) | 28.01 | 14.74 |
| (E1) | 0.07 | 0.07 |
| (D1) | 0.58 | 0.58 |
| (A-C3) | 0 | 11.98 |
| (C1) | 1.33 | 2.65 |

Examples 26-28 and Comparative Examples 21-22

The release coating compositions of Examples 23-25 and Comparative Examples 19-20 utilized to prepare coated substrates. In particular, each composition is coated onto a substrate (Glassine paper) and cured (exit web oven temperature: 165.56° C.; dwell time: 11 s) to form a coated substrate, samples of which are evaluated for immediate extractable %, immediate ROR %, and release force at various speeds, namely at 0.3 m/min (MPM), 10 m/min (MPM), 100 m/min (MPM), and 300 m/min (MPM), at 180 degree peeling. Release force was measured via an Imass SP-2100 and ZPE-1100W release test system after lamination with Tesa 7475 standard tape under 40 lbs at RT and 50% RH after aging for 50 minutes. The results are set forth below in Table 11. Example 26 utilizes the composition of Example 23; Example 27 utilizes the composition of Example 24; and Example 28 utilizes the composition of Example 25. The same correlation applies to Comparative Examples 21-22 and the compositions of Comparative Examples 19-20.

TABLE 11

| | 0.3 m/min | 7.62 m/min | 100 m/min | 300 m/min | Extractable % | ROR % |
|---|---|---|---|---|---|---|
| C.E. 21 | 44.5 | 68.26 | 113.82 | 89.8 | 3.42 | 96.78 |
| C.E. 22 | 37.4 | 71.76 | 102.24 | 54.63 | 3.33 | 97.42 |
| 26 | 129.33 | 152.72 | 152.36 | 119.23 | 0.37 | 93.23 |
| 27 | 104.83 | 151.15 | 156.47 | 106.14 | 0 | 96.37 |
| 28 | 131.2 | 154.95 | 184.31 | 109.44 | 0.4 | 93.46 |

Definitions and Usage of Terms

Abbreviations used in the specification have the definitions in Table 12, below.

TABLE 12

Abbreviations

| Abbreviation | Definition |
|---|---|
| cP | centiPose |
| d | day |
| Da | Daltons |
| DP | degree of polymerization |
| FTIR | Fourier Transfer Infra-Red |
| g | grams |
| GC | gas chromatography |
| GPC | gel permeation chromatography |
| HPLC | high performance liquid chromatography |
| Me | methyl |
| mg | milligrams |
| MHz | megaHertz |
| mL | milliliters |
| mm | millimeters |
| Mn | number average molecular weight as measured by |
| Mp | Peak molecular weight as measured by GPC |
| mPa · s | milli-Pascal seconds |
| MS | mass spectroscopy |
| Mw | weight average molecular weight |
| Mz | Z-average molecular weight |
| NMR | nuclear magnetic resonance |
| O.D. | outer diameter |
| PD | polydispersity |
| Ph | phenyl |
| ppm | parts per million |
| PTFE | polytetrafluoroethylene |
| RH | relative humidity |
| RT | room temperature of 25° C. |
| s | seconds |
| SiH content | hydrogen, as silicon bonded hydrogen, as measured by $^{29}$Si NMR |
| THF | tetrahydrofuran |
| μL | microliter |
| μm | micrometer |
| Vi | vinyl |

It is to be understood that the appended claims are not limited to express and particular compounds, compositions, or methods described in the detailed description, which may vary between particular embodiments which fall within the scope of the appended claims.

What is claimed is:

1. A base composition for forming a release coating composition, said base composition comprising:

(A) a silicate resin that is a liquid at 25° C. in the absence of any solvent, the (A) silicate resin including an average of at least one silicon-bonded ethylenically unsaturated group per molecule; and (B) an organopolysiloxane including an average of at least two silicon-bonded ethylenically unsaturated groups per molecule;

wherein the (A) silicate resin is miscible with the (B) organopolysiloxane in the absence of any solvent;

wherein the (A) silicate resin has the average formula

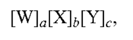

where subscript a is from 0.15 to 0.40; subscript b is from 0.10 to 0.40; and subscript c is from 0.35 to 0.60; and wherein:

[W] is $[R_3SiO_{1/2}]$, where each R is an independently selected hydrocarbyl group;

[X] is $[R_2SiO_{1/2}(OZ)]_{b'}$, $[R_2SiO_{2/2}]_{b''}$, where each R is independently selected and as defined above; 0≤b'≤b; 0≤b''≤b; with the proviso that b'+b''=b; and each Z is independently H, an alkyl group, or a cation; and

[Y] is $[Si(OZ)_{c'}O_{4-c'/2}]$, where each Z is independently selected and as defined above, and subscript c' is an integer from 0 to 3 and is independently selected in each siloxy unit indicated by subscript c in the (A) silicate resin;

with the proviso that at least one of R is an ethylenically unsaturated group;

wherein the silicate resin (A) has a mole percent of SiOZ moieties of from 12 to 80 percent based on the total number of moles of Si in each molecule, wherein Z is independently selected from H, an alkyl group, or a cation.

2. The base composition of claim 1, substantially free from any organic solvent.

3. The base composition of claim 1, wherein subscript a is from 0.25 to 0.35; subscript b is from 0.15 to 0.30; and subscript c is from 0.40 to 0.55.

4. The base composition of claim 1, wherein the (B) organopolysiloxane:

(i) is a linear or branched organopolysiloxane including the silicon-bonded ethylenically unsaturated groups in at least one M siloxy unit; or (ii) has the formula $(R^2_yR^1_{3-y}SiO_{1/2})_x(R^1R^2SiO_{2/2})_z(SiO_{4/2})$, where each $R^1$ is an independently selected hydrocarbyl group free of ethylenic unsaturation; each $R^2$ is independently selected from $R^1$ and an ethylenically unsaturated group; subscript y is independently selected in each siloxy unit indicated by subscript x and is 1 or 2; subscript x is from 1.5 to 6; and subscript z is from 3 to 1,000.

5. The base composition of claim 1, wherein component (A) has a weight percent of silicon-bonded ethylenically unsaturated groups of from greater than 0 to 10 based on the total weight of component (A).

6. A release coating composition, comprising:

the base composition according to claim 1;

(C) an organosilicon compound having at least two silicon-bonded hydrogen atoms;

(D) a hydrosilylation catalyst; and optionally, (E) an inhibitor.

7. The release coating composition of claim 6, wherein the (C) organosilicon compound comprises an organohydrogensiloxane including an average of at least two pendent silicon-bonded hydrogen atoms per molecule.

8. The release coating composition of claim 6, wherein the (C) organosilicon compound has the formula $H_{y'}R^1_{3-y'}Si—(OSiR^1_2)_m—(OSiR^1H)_{m'}—OSiR^1_{3-y'}H^{y'}$, where each $R^1$ is an independently selected hydrocarbyl group free of ethylenic unsaturation, each y' is independently selected from 0 or 1, subscripts m and m' are each from 0 to 1,000 with the proviso that m and m' are not simultaneously 0 and m+m' is from 1 to 1,000.

9. The release coating composition of claim 6, wherein component (A) is present in an amount of from 10 to 60 weight percent, component (B) is present in an amount of from 20 to 80 weight percent, and component (C) is present in an amount of from 2 to 40 weight percent, each based on the total weight of the release coating composition.

10. A method of preparing the release coating composition of claim 6, said method comprising:

combining components (A) and (B) to give a base composition; and combining the base composition with components (C) and (D) to give the release coating composition.

11. The method of claim 10, further comprising forming the (A) silicate resin from a solid silicate resin.

12. The method of claim 10, wherein the method is free from any solvents, and components (A) and (B) are combined such that the mixture is substantially free from any solvent.

13. A method of forming a coated substrate, said method comprising:

applying a composition on a substrate; and curing the composition to give a release coating on the substrate, thereby forming the coated substrate;

wherein the composition is the release coating composition of claim 8.

14. The method of claim 13, wherein the substrate comprises cellulose and/or a polymer.

15. A coated substrate formed in accordance with the method of claim 13.

* * * * *